US012666465B2

(12) United States Patent
Zhou et al.

(10) Patent No.: US 12,666,465 B2
(45) Date of Patent: Jun. 23, 2026

(54) WIRELESS COMMUNICATION METHOD, STATION DEVICE, AND ACCESS POINT DEVICE

(71) Applicant: GUANGDONG OPPO MOBILE TELECOMMUNICATIONS CORP., LTD., Dongguan (CN)

(72) Inventors: Pei Zhou, Dongguan (CN); Lei Huang, Singapore (SG)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 329 days.

(21) Appl. No.: 18/388,949

(22) Filed: Nov. 13, 2023

(65) Prior Publication Data

US 2024/0098789 A1    Mar. 21, 2024

Related U.S. Application Data

(63) Continuation of application No. PCT/CN2021/101336, filed on Jun. 21, 2021.

(51) Int. Cl.
*H04W 74/0816* (2024.01)
*H04L 5/00* (2006.01)
*H04W 74/08* (2024.01)

(52) U.S. Cl.
CPC ....... *H04W 74/0816* (2013.01); *H04L 5/0053* (2013.01); *H04W 74/0866* (2013.01)

(58) Field of Classification Search
CPC .......... H04W 74/0816; H04W 74/0866; H04L 5/0866
See application file for complete search history.

(56) References Cited

U.S. PATENT DOCUMENTS

| | | | |
|---|---|---|---|
| 10,390,355 B2 | 8/2019 | Guo | |
| 11,228,409 B2 | 1/2022 | Chitrakar | |
| 2015/0063251 A1 | 3/2015 | Asterjadhi | |
| 2016/0330757 A1* | 11/2016 | Cherian | .......... H04W 72/1268 |

(Continued)

FOREIGN PATENT DOCUMENTS

| | | |
|---|---|---|
| CN | 105474690 A | 4/2016 |
| CN | 108476530 A | 8/2018 |

(Continued)

OTHER PUBLICATIONS

Second Office Action of the European application No. 21946317.1, issued on May 21, 2025. 9 pages.

(Continued)

*Primary Examiner* — James P Duffy
(74) *Attorney, Agent, or Firm* — BAYES PLLC

(57) ABSTRACT

Wireless communication methods, station devices, and access point devices are provides. The method includes: a first site receiving a multiple-user request-to-send transmission opportunity sharing trigger frame (MU-RTS-TXS TF); and the first site configuring, according to time information and/or first indication information indicated by a duration field in the MU-RTS-TXS TF, time information indicated by a duration field in a clear-to-send (CTS) frame, the first indication information being used to indicate time information of an access point sharing part of an obtained transmission opportunity (TXOP) to at least one site.

20 Claims, 11 Drawing Sheets

(56)                    References Cited

U.S. PATENT DOCUMENTS

| 2018/0014316 | A1 | 1/2018 | Guo |
| 2020/0322105 | A1 | 10/2020 | Chitrakar |
| 2021/0111855 | A1 | 4/2021 | Lochan |
| 2021/0194662 | A1 | 6/2021 | Guo |

FOREIGN PATENT DOCUMENTS

| CN | 108702375 | A | 10/2018 |
| CN | 109315013 | A | 2/2019 |
| CN | 110880962 | A | 3/2020 |
| CN | 112672429 | A | 4/2021 |
| GB | 2549967 | A | 11/2017 |

OTHER PUBLICATIONS

"Part 11: Wireless LAN Medium Access Control (MAC) and Physical Layer (PHY) Specifications", IEEE Draft; Draft P802.11 REVMD_D1.1, IEEE-SA, Piscataway, NJ USA vol. 802.11md drafts; 802.11 drafts; 802.11m drafts, No. D1.1 1, Jun. 2018 (Jun. 1, 2018), pp. 1-4239, XP068137895, section 9.2.5.2-9.2.5.7.

LAN/MAN Standards Committee of the IEEE Computer Society: IEEE Draft; Draft P802.11AX_D4.2, IEEE-SA, Piscataway, NJ USA, vol. 802. 11ax drafts, No. D4.2 Jun. 17, 2019 (Jun. 17, 2019), XP068150637, Sections: 9.2.5.2 Setting for single and multiple protection under enhanced distributed channel access (EDCA)-9.2. 5.7 Setting for control response frames, 9.3.1.3 CTS frame format, 26.2.6 MU-RTS Trigger/CTS frame exchange procedure, 26.2.6.1 General, figure 26-1. 766 pages.

Supplementary European Search Report in the European application No. 21946317.1, mailed on Apr. 15, 2024, 11 pages.

International Search Report in the international application No. PCT/CN2021/101336, mailed on Mar. 14, 2022. 5 pages with English translation.

Written Opinion of the International Search Authority in the international application No. PCT/CN2021/101336, mailed on Mar. 14, 2022. 8 pages with English translation.

IEEE Standard for Information Technology-Telecommunications and Information Exchange between Systems Local and Metropolitan Area Networks-Specific Requirements, Part 11: Wireless LAN Medium Access Control (MAC) and Physical Layer (PHY) Specifications, IEEE Computer Society, Developed by the LAN/MAN Standards Committee, IEEE Std 802.11™—2020 (Revision of IEEE Std 802.Nov. 2016). pp. 790-792, and 794. 4379 pages.

IEEE Standard for Information Technology-Telecommunications and Information Exchange between Systems Local and Metropolitan Area Networks-Specific Requirements, Part 11: Wireless LAN Medium Access Control (MAC) and Physical Layer (PHY) Specifications, Amendment 1: Enhancements for High-Efficiency WLAN, IEEE Computer Society, Developed by the LAN/MAN Standards Committee, IEEE Std 802.11ax™—2021 (Amendment to IEEE Std 802.11-2020). pp. 93-94, and 96. 767 pages.

IEEE P802.11be™/D1.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), IEEE P802.11be/D1.0, May 2021. pp. 74 and 243-245. 635 pages.

3GPP TSG-RAN WG1 Meeting #93 Tdoc R1-1806253, Busan, Korea, May 21-25, 2018, Agenda Item: 7.6.4.1, Source: Ericsson, Title: Channel access mechanisms, Document for: Discussion, Decision. pp. 1-6. 6 pages.

Supplementary European Search Report in the European application No. 25227554.0, mailed on Jan. 29, 2026.

* cited by examiner

100

Frequency

Frequency

STA1, G1 channel corresponding to first 20MHz
STA2, G2 channel corresponding to second 20MHz

| B0    B11 | B12        B19 | B20    B(20+$i$-1) | B(20+$i$)B(20+$i$+$j$-1) | B39 |
|:---:|:---:|:---:|:---:|:---:|
| AID12 | RU allocation | Time Duration Allocation | Start time | Reserved |

Bits:      12              8                    $i$                        $j$              Variable

WIRELESS COMMUNICATION METHOD, STATION DEVICE, AND ACCESS POINT DEVICE

CROSS-REFERENCE TO RELATED APPLICATION

The present disclosure is a continuation application of International Application No. PCT/CN2021/101336, filed on Jun. 21, 2021. The disclosure of the above application is hereby incorporated by reference in its entirety.

BACKGROUND

In a series of standards for 802.11, manners of setting a duration field of a frame may include two types, i.e., single protection settings and multiple protection settings.

802.11be proposes a triggered Transmission Opportunity (TXOP) sharing procedure, the sharing mechanism allows an AP to share a part of TXOP obtained by itself with a non-AP STA for use, the non-AP STA may send one or more non-Trigger Based Physical Layer Protocol Data Units (non-TB PPDUs) to its associated AP or another STA within the shared TXOP.

When the triggered TXOP sharing procedure is introduced, how to set a duration field of a relevant frame in the triggered TXOP sharing procedure to meet requirements of the triggered TXOP sharing procedure is an urgent problem to be solved.

SUMMARY

Embodiments of the disclosure relate to the communication field, and in particular to a method for wireless communication, a station (STA) device, and an access point (AP) device.

According to a first aspect, there is provided a method for wireless communication, including the following operations. A first STA device receives a MU-RTS-TXS TF sent by an AP device. The first STA sets time information indicated by a duration field in a CTS frame according to time information indicated by a duration field in the MU-RTS-TXS TF and/or first indication information. The first indication information is configured to indicate time information for the AP to share a part of an obtained TXOP with at least one STA.

According to a second aspect, there is provided a method for wireless communication, including the following operations. An AP sends a MU-RTS-TXS TF to at least one STA. Time information indicated by a duration field in the MU-RTS-TXS TF and/or a first indication information are used by the at least one STA to set time information indicated by a duration field in a CTS frame, the first indication information is configured to indicate time information for the AP to share a part of an obtained TXOP with the at least one STA.

According to a third aspect, there is provided a STA device, the STA device is configured to execute the method according to the first aspect or various implementations thereof.

Specifically, the STA device includes functional modules configured to execute the method according to the first aspect or various implementations thereof.

According to a fourth aspect, there is provided an AP device, the AP device is configured to execute the method according to the second aspect or various implementations thereof.

Specifically, the AP includes functional modules configured to execute the method according to the second aspect or various implementations thereof.

According to a fifth aspect, there is provided a STA device, including a memory and a processor. The memory is configured to store a computer program. The processor is configured to call and run the computer program stored in the memory, to execute the method according to the first aspect or various implementations thereof.

According to a sixth aspect, there is provided an AP device, including a memory and a processor. The memory is configured to store a computer program. The processor is configured to call and run the computer program stored in the memory, to execute the method according to the second aspect or various implementations thereof.

According to a seventh aspect, there is provided a chip, the chip is configured to implement the method according to any one of the first aspect and the second aspect or various implementations thereof.

Specifically, the chip includes a processor, the processor is configured to call and run a computer program from a memory, so that a device installed with the apparatus executes the method according to any one of the first aspect and the second aspect or various implementations thereof.

According to an eighth aspect, there is provided a computer-readable storage medium, the computer-readable storage medium is configured to store a computer program, the computer program allows a computer to execute the method according to any one of the first aspect and the second aspect or various implementations thereof.

According to a ninth aspect, there is provided a computer program product, including computer program instructions. The computer program instructions allow a computer to execute the method according to any one of the first aspect and the second aspect or various implementations thereof.

According to a tenth aspect, there is provided a computer program, the computer program allows a computer to execute the method according to any one of the first aspect and the second aspect or various implementations thereof when the computer program is run on the computer.

DETAILED DESCRIPTION

The disclosure provides a method for wireless communication, a STA device and an AP device. The STA may set a duration field in a Clear-To-Send (CTS) frame according to a duration field in a Multiple-User Request-To-Send Transmission Opportunity Sharing Trigger Frame (MU-RTS TXS TF) or first indication information, which is beneficial to protect the CTS frame until an end time of sharing time of the AP.

With the above technical solutions, the STA sets the duration field of the CTS frame according to the duration field in the MU-RTS-TXS TF or the first indication information sent by the AP, so that the CTS frame set by the STA may protect the time resources shared by the AP with the STA, thereby avoiding a problem that other users occupy TXOP time resources shared by the AP.

The technical solutions in the embodiments of the disclosure will be described below with reference to the drawings in the embodiments of the disclosure. It is apparent that the described embodiments are part of the embodiments of the disclosure, rather than all of the embodiments. With respect to the embodiments of the disclosure, all other embodiments obtained by those of ordinary skill in the art without paying any creative work belong to the scope of protection of the disclosure.

The technical solutions of the embodiments of the disclosure may be applied to various communication systems, such as a Wireless Local Area Network (WLAN), Wireless Fidelity (WiFi), or other communication systems, etc.

Figure 1:
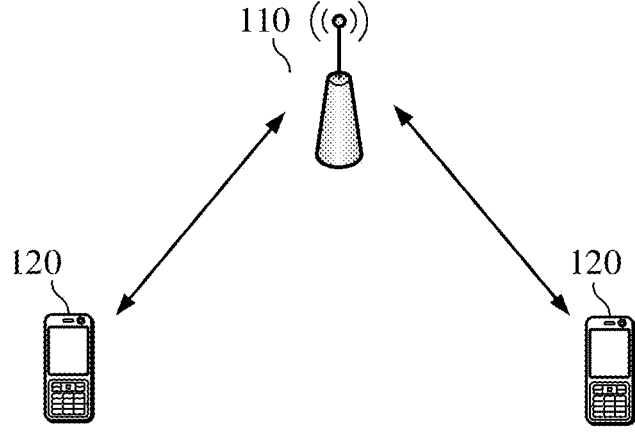
FIG. 1 is a schematic diagram of a communication system architecture applied in an embodiment of the disclosure.

Exemplarily, a communication system 100 to which the embodiments of the disclosure are applied is shown in FIG. 1. The communication system 100 may include an Access Point (AP) device 110 and a station (STA) device 120 accessing a network through the AP device 110.

In the embodiments of the disclosure, the STA device may be deployed on the land, including indoor or outdoor, handheld, worn or vehicle-mounted; or the STA device may be deployed in the water (such as a ship, etc.); or the STA device may be deployed in the air (such as an aircraft, a balloon, a satellite, etc.).

In the embodiments of the disclosure, the STA device may be a mobile phone, a pad, a computer with a wireless transceiver function, a Virtual Reality (VR) device, an Augmented Reality (AR) device, a wireless device in industrial control, a wireless device in self driving, a wireless device in remote medical, a wireless device in a smart grid, a wireless device in transportation safety, a wireless device in a smart city, or a wireless device in a smart home, etc.

As an example rather than limitation, in the embodiments of the disclosure, the STA device may also be a wearable device. The wearable device may also be referred to as a wearable smart device, which is a general term for wearable devices developed by applying wearable technologies to intelligently design daily wears, such as glasses, gloves, watches, clothing, shoes, etc. The wearable device is a portable device which is directly worn on the body or integrated into a user's clothing or accessory. The wearable device is not only a hardware device, but also achieves powerful functions through supporting of software, data interaction and cloud-based interaction. Generalized wearable smart devices include devices with full functions, large sizes, implementing complete or partial functions without relying on smart phones, such as smart watches or smart glasses, etc., and devices focusing on only a certain type of application functions and requiring cooperation with other devices such as smart phones in use, such as various smart bracelets and smart jewelry for monitoring physical signs, etc.

FIG. 1 exemplarily shows one AP and two STAs. Optionally, the communication system 100 may include multiple APs and other numbers of STAs, which are not limited in the embodiments of the disclosure.

It should be understood that in the embodiments of the disclosure, a device with a communication function in a network/system may be referred to as a communication device. The communication system 100 shown in FIG. 1 is taken as an example, the communication device may include an AP 110 and a STA 120 with communication functions, and the AP 110 and the STA 120 may be the above specific devices respectively, which are not be elaborated here. The communication device may also include other devices in the communication system 100, such as a network controller, gateway and other network entities, which are not limited in the embodiments of the disclosure.

It should be understood that terms "system" and "network" are often interchangeably used here. A term "and/or" here is only an association relationship describing associated objects, and indicates that there may be three relationships. For example, A and/or B may indicate three situations, i.e., A exists alone, A and B exist simultaneously, and B exists alone. Furthermore, a character "/" here generally indicates that anterior and posterior associated objects are in a "or" relationship.

It should be understood that "indication" mentioned in the embodiments of the disclosure may be a direct indication, or may be an indirect indication, or may indicate that there is an association relationship. For example, A indicates B, which may mean that A directly indicates B, for example, B may be obtained through A; or may mean that A indirectly indicates B, for example, A indicates C, and B may be obtained through C; or may indicate that there is an association relationship between A and B.

Terms used in sections of the embodiments of the disclosure are only intended to explain specific embodiments of the disclosure, and are not intended to limit the disclosure. Terms "first", "second", "third", "fourth" or the like in the description, claims and the drawings of the disclosure are intended to distinguish different objects, and are not intended to describe a specific order. Furthermore, terms "include", "have" as well as any variations thereof, are intended to cover a non-exclusive inclusion.

In descriptions of the embodiments of the disclosure, a term "corresponding" may indicate that there are direct or indirect correspondences between two items, or may indicate that there is an association relationship between two items, or may be a relationship such as indicating and indicated, configuring and configured, etc.

In the embodiments of the disclosure, "predefined" or "preconfigured" may be implemented by pre-saving corresponding codes, tables or other manners which may be used to indicate related information in a device (for example, including a STA and an AP), specific implementations thereof are not limited in the disclosure. For example, "predefined" may refer to defined in a protocol.

In the embodiments of the disclosure, "protocol" may refer to a standard protocol in the communication field, for example, it may include a WiFi protocol and related protocols applied to future WiFi communication systems, which are not limited in the disclosure.

"STA" described in the embodiments of the disclosure may specifically be a "non-AP STA".

In order to facilitate understanding the embodiments of the disclosure better, a Transmission Opportunity (TXOP) sharing mechanism related to the disclosure will be described.

Figure 2:
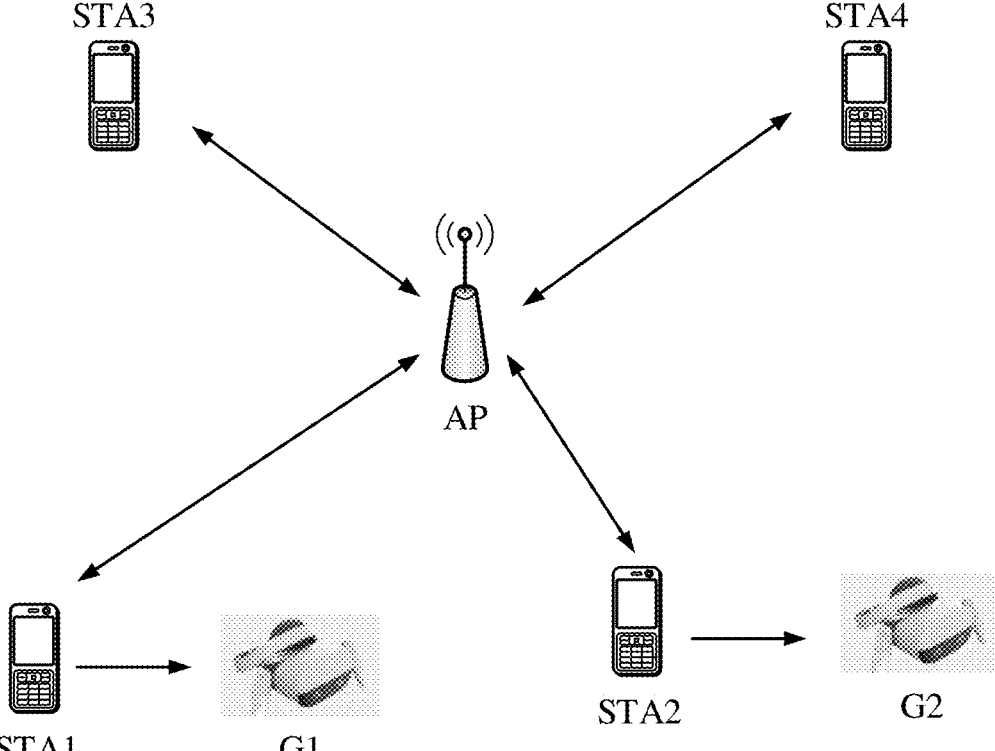
FIG. 2 is a schematic scenario diagram of sharing TXOP by an AP according to the disclosure.
Figure 3:
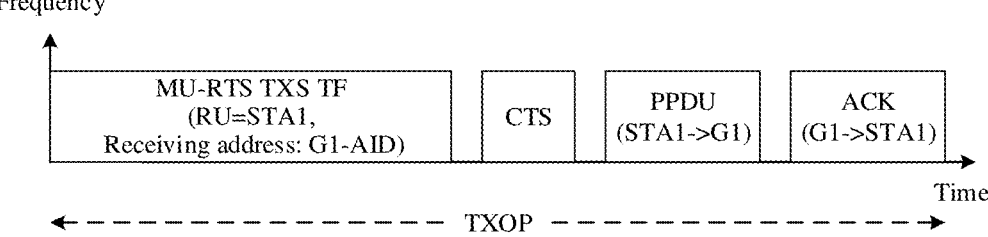
FIG. 3 is a schematic diagram of sharing TXOP with one STA by an AP according to the disclosure.

802.11be proposes a triggered TXOP sharing procedure, as shown in the scenario diagram of FIG. 2. The TXOP sharing mechanism allows an AP to share a part of TXOP obtained by itself with a non-AP STA for use, and this non-AP STA may send one or more non-Trigger Based Physical Layer Protocol Data Units (non-TB PPDUs) to its associated AP or another STA within the shared TXOP. As shown in FIG. 3, TXOP obtained by the AP may be shared with STA1, so that STA1 sends a non-TB PPDU to a smart glass1 (G1).

Specifically, as shown in FIG. 3, the AP shares Resource Units (RUs) in the TXOP acquired by itself with STA1 through a Multiple-User Request-To-Send Transmission Opportunity Sharing Trigger Frame (MU-RTS TXS TF), and STA1 starts to use time domain resources shared by the AP after the AP sends the MU-RTS TXS TF. Specifically, STA1 sends a Clear-To-Send (CTS) frame to G1, STA1 sends a Physical Layer Protocol Data Unit (PPDU) to G1, and G1 sends an Acknowledgment (ACK) frame to STA1.

In order to facilitate understanding the embodiments of the disclosure better, another TXOP sharing mechanism related to the disclosure will be described.

Figure 4:
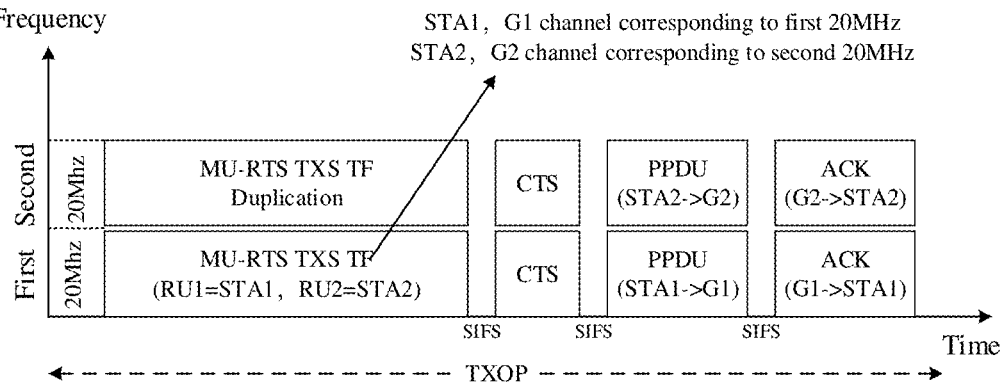
FIG. 4 is a schematic diagram of sharing TXOP with two STAs by an AP according to the disclosure.

The TXOP sharing mechanism allows an AP to share a part of TXOP obtained by itself with multiple non-AP STAs for use. As shown in the scenario diagram of FIG. 2, the TXOP obtained by the AP may be shared with STA1 and STA2 to be used by STA1 and STA2 simultaneously. As shown in FIG. 4, in the TXOP, the AP allocates RU1 to STA1 for STA1, so that STA1 sends a non-TB PPDU to G1, and the AP allocates RU2 to STA2, so that STA1 sends a non-TB PPDU to a smart glass2 (G2).

Figure 5:
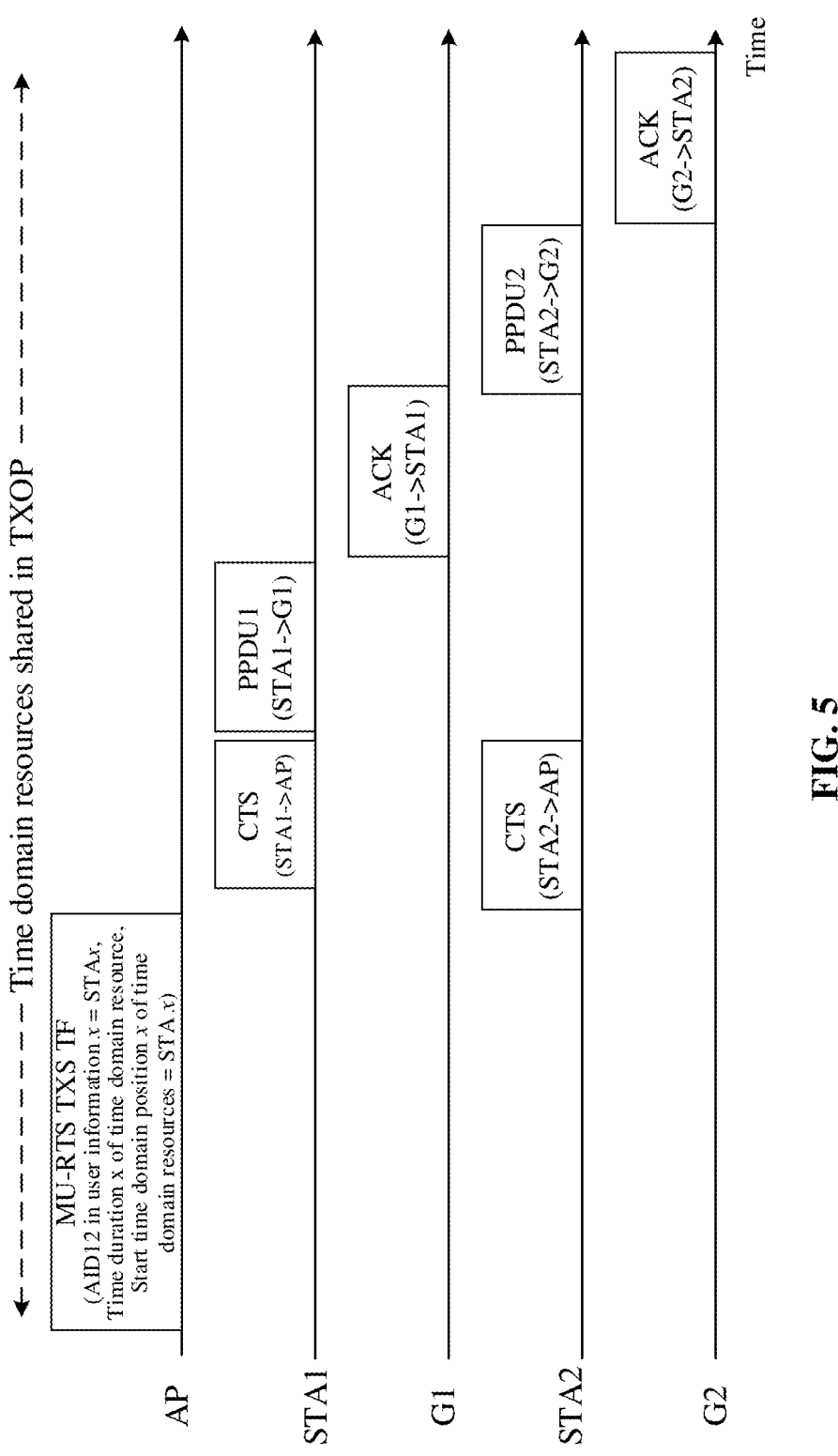
FIG. 5 is a schematic diagram of time sharing of TXOP acquired by an AP by multiple users according to an embodiment of the disclosure.

FIG. 5 is a schematic interaction diagram of an AP allocating a part or all of time domain resources of TXOP to multiple non-AP STAs to be used by multiple non-AP STAs. Specifically, the AP shares a part of the time domain resources of the TXOP acquired by itself with STA1 and STA2, and STA1 and STA2 reply CTS frames to the AP synchronously; STA1 sends PPDU1 to G1 on its allocated time domain resources, and G1 replies ACK to STA1; STA2 sends PPDU2 to G2 on its allocated time domain resources, and G2 replies ACK to STA2.

In a series of standards for 802.11, manners of setting a duration field of a frame may include two types, i.e., single protection settings and multiple protection settings.

A manner in which the AP sets a duration field of the MU-RTS TXS TF by adopting the type of single protection settings to is as follows.

The duration field of the MU-RTS TXS TF is set to transmit a pending frame, plus a CTS frame, plus an ACK or Block ACK (BA) frame (if required), plus any Null Data Physical Layer (PHY) Protocol Data Unit (NDP) (if required), plus explicit feedback (if required), and plus time required by applicable InterFrame Spaces (IFSs).

That is, a time information indicated by the duration field of the MU-RTS TXS TF may be expressed by a formula as follows:

$$Time[Duration\ field\ of\ MU\text{-}RTS\ TXS\ TF]=Time\\ [CTS]+Time[applicable\ IFSs]+Time[pending\\ PPDU]+Time[one\ ACK\ frame\ or\ BA\ frame\ (if\\ required)]+Time[NDP\ (if\ required)]+Time[ex-\\ plicit\ feedback\ (if\ required)]$$

Time[Duration field of MU-RTS TXS TF] indicates the time information indicated by the duration field of the MU-RTS TXS TF, Time[CTS] indicates time required to transmit the CTS frame, Time[applicable IFSs] indicates one or more IFSs, Time[pending frame] indicates time required to transmit the pending PPDU, Time[one ACK frame or BA frame (if required)] indicates time required to transmit one ACK frame or BA frame when the ACK frame or BA frame needs to be sent, Time[NDP (if required)] indicates time required to transmit the NDP when the NDP needs to be sent, and Time[explicit feedback (if required)] indicates time required to transmit the explicit feedback when the explicit feedback is required.

Correspondingly, a manner in which the AP sets a duration field of the CTS frame with the type of single protection settings is as follows.

The duration field of the CTS frame is set to the time information acquired from the duration field in the MU-RTS TXS TF minus a first time duration. The first time duration indicates a time duration between an end time of a PPDU carrying the MU-RTS TXS TF and an end time of a PPDU carrying the CTS frame. The CTS frame is elicited by the MU-RTS TXS TF.

That is, time indicated by the duration field of the CTS frame may be expressed by a formula as follows:

$$Time[Duration\ field\ of\ CTS]=Time[Duration\ field\ of\\ MU\text{-}RTS\ TXS\ TF]-SIFS-Time[CTS].$$

Time[Duration field of CTS] indicates a time information indicated by the duration field of the CTS frame, Time [Duration field of MU-RTS TXS TF] indicates the time information indicated by the duration field of the MU-RTS TXS TF, and Time[CTS] indicates time required to transmit the CTS frame.

Figure 6:
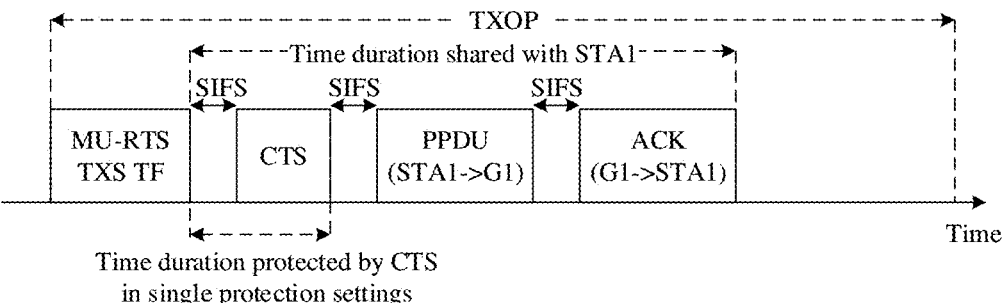
FIG. 6 is a schematic diagram of a time duration protected by a CTS frame in single protection settings.

Since the AP does not have pending PPDUs in the triggered TXOP sharing procedure, it may only protect until an end time of the CTS frame based on the above manner of setting the duration field. As shown in FIG. 6, furthermore, the non-AP STA cannot correctly set time shared by the AP when the non-AP STA sets the duration field of the CTS frame according to the duration field of the MU-RTS TXS TF.

Furthermore, when the AP sets the duration field with the manner of multiple protection settings, existing methods for calculating value of the duration field do not consider related frame exchanges in the triggered TXOP sharing mechanism, resulting in that the non-AP STA cannot correctly set time shared by the AP when the non-AP STA sets the duration field of the CTS frame according to the duration field of the MU-RTS TXS TF.

Furthermore, the non-AP STA cannot identify whether the AP sets the duration field by single protection settings or multiple protection settings. Therefore, when the non-AP STA sets the duration field of the CTS frame according to the duration field of the MU-RTS TXS TF, it may result in that time protected by the CTS frame is inaccurate, and may further result in that other users occupy time resources shared by the AP.

The technical solutions of the disclosure are described in detail below through specific embodiments.

Figure 7:
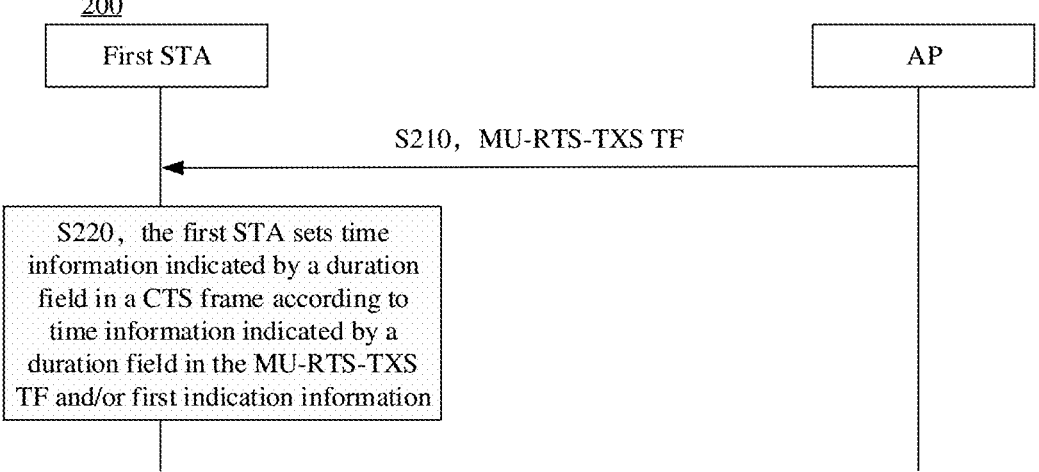
FIG. 7 is a schematic interaction flowchart of a method for wireless communication according to an embodiment of the disclosure.

FIG. 7 is a schematic interaction flowchart of a method 200 for wireless communication according to an embodiment of the disclosure. As shown in FIG. 7, the method 200 includes the following contents.

At S210, a first STA receives a MU-RTS-TXS TF sent by an AP.

At S220, the first STA sets time information indicated by a duration field in a CTS frame according to time information indicated by a duration field in the MU-RTS-TXS TF and/or first indication information. The first indication information is configured to indicate time information for the AP to share a part of an obtained TXOP with at least one STA.

In some embodiments, the AP may send the MU-RTS-TXS TF to at least one STA, and the first STA is any one of the at least one STA.

In the embodiment of the disclosure, the AP may share a part or all of time domain resources of the TXOP obtained by itself with at least one STA, so that the at least one STA may communicate based on the time domain resources shared by the AP, thereby reducing communication delay of the STA.

It should be understood that in the embodiment of the disclosure, the MU-RTS-TXS TF may be replaced by any Trigger Frame (TF) sent by the AP in the TXOP sharing mechanism, which is not limited in the disclosure. Hereinafter, setting of the duration field in the MU-RTS-TXS TF is taken as an example for illustration, and such setting manner is also applicable to other TFs in the TXOP sharing mechanism.

It should be noted that the duration field in the embodiment of the disclosure may be replaced by other fields in the MU-RTS-TXS TF, such as an Identify (ID) field, the disclosure is not limited thereto. Hereinafter, setting of the duration field in the MU-RTS-TXS TF is taken as an example for illustration, and such setting manner is also applicable to other fields in the MU-RTS-TXS TF when related information of sharing time of the AP is carried by the other fields.

Manners of setting the duration field in the MU-RTS-TXS TF will be described below in combination with specific embodiments.

First Embodiment

In some embodiments of the disclosure, the AP considers possible frame exchanges in TXOP sharing when the AP sets the duration field of the MU-RTS-TXS TF. Based on such setting manner, it is beneficial to ensure accuracy of protection time of the CTS frame when the STA sets the duration field of the CTS according to the duration field of the MU-RTS-TXS TF.

In some embodiments of the disclosure, the time information indicated by the duration field in the MU-RTS-TXS TF is determined according to at least one of: the estimated time required for an allowed transmission in a triggered TXOP sharing procedure, and, the estimated time required for transmission of the allowed frame exchange sequence defined in TXOP limits.

In order to facilitate distinction and description, in the embodiments of the disclosure, the estimated time required for the allowed transmission in the triggered TXOP sharing procedure is denoted by $T_{PENDING}$, and the estimated time required for transmission of the allowed frame exchange sequence defined in TXOP limits is denoted by $T_{SINGLE\text{-}MSDU}$.

Optionally, the estimated time required for transmission of the allowed frame exchange sequence defined in TXOP limits may refer to an estimated time required for transmission of an allowed frame exchange sequence in TXOP limits which are 0.

In some embodiments of the disclosure, the estimated time required for the allowed transmission in the triggered TXOP sharing procedure includes estimated time required for transmission of at least one frame of the following: an uplink pending Media Access Control Protocol Data Unit (MPDU) in the triggered TXOP sharing procedure, a peer-to-peer pending MPDU in a TXOP sharing mode 2 in the triggered TXOP sharing procedure; and transmission of an Extremely High Throughput (EHT) sounding NDP.

In some embodiments, the allowed transmission in the triggered TXOP sharing procedure further includes transmission of at least one frame of the following: pending MPDU, any associated immediate response frame, any High Throughput (HT, corresponding to 802.11n) NDP, Very High Throughput (VHT, corresponding to 802.11ac) NDP, High-efficiency (HE, corresponding to 802.11ax) sounding NDP, EHT (corresponding to 802.11be) sounding NDP, Beamforming Report Poll frame transmission, explicit feedback response frame, applicable IFSs, any Reverse Direction Grant (RDG) frame, any bidirectional TXOP, any pending Quality-of-Service (QoS) null frames exchanged between paged STAs, and any pending Power Save-Poll (PS-Poll) or NDP PS-Poll frame exchanged between paged STAs.

It should be understood that the above allowed transmission in the triggered TXOP sharing procedure is only an example, and in other embodiments, the allowed transmission in the triggered TXOP sharing procedure may further include other related frame exchanges, which are not limited in the embodiments of the disclosure.

In some embodiments of the disclosure, the transmission of the allowed frame exchange sequence defined in TXOP limits includes at least one of the following: Extremely High Throughput Multiple-User Physical Layer Protocol Data Unit (EHT MU PPDU), Extremely High Throughput Trigger-Based Physical Layer Protocol Data Unit (EHT TB PPDU), MU-RTS-TXS TF, and CTS frame.

Optionally, the EHT MU PPDU may refer to EHT MU PPDU carrying a single Media Access Control (MAC) Service Data Unit (MSDU), a single aggregate MAC Management Protocol Data Unit (MMPDU), a single aggregate MSDU (A-MSDU) or a single aggregate MAC Protocol Data Unit (A-MPDU).

Optionally, the EHT TB PPDU may refer to EHT TB PPDU carrying a single MSDU, a single MMPDU, a single A-MSDU or a single A-MPDU.

In some embodiments, the transmission of the allowed frame exchange sequence defined in TXOP limits further includes at least one of the following:

one or more Single-User PPDUs (SU PPDUs) carrying a single MSDU or MMPDU fragment;

a SU PPDU or Very High Throughput Multiple-User Physical Layer Protocol Data Unit (VHT MU PPDU) or High-efficiency Multiple-User Physical Layer Protocol Data Unit (HE MU PPDU) or High-efficiency Trigger-Based Physical Layer Protocol Data Unit (HE TB PPDU) carrying a single MSDU, a single MMPDU, a single A-MSDU or a single A-MPDU;

any required ACK frame;

any frame which needs to be protected, such as any Request-To-Send (RTS)/CTS, or Multiple-User RTS (MU-RTS) Trigger/CTS, or MU-RTS Transmission Opportunity Sharing (TXS) Trigger/CTS frame exchange.

It should be understood that the above allowed frame exchange sequence defined in TXOP limits is only an example. In other embodiments, the allowed frame exchange sequence defined in TXOP limits may further include other related frame exchanges, which are not limited in the embodiments of the disclosure.

In some embodiments of the disclosure, besides the above $T_{SINGLE-MSDU}$ and $T_{PENDING}$, the AP may also set value of the duration field in the MU-RTS-TXS TF, according to at least one of: time $T_{TXOP}$ set for a certain Access Category (AC) by dot11EDCATableTXOPLimit, remaining time $T_{TXOP-REMAINING}$ in $T_{TXOP}$, remaining duration $T_{END-NAV}$ of any Network Allocation Vector (NAV) set by a TXOP holder, and time $T_{TPPDU}$ required for transmission of a current PPDU.

In some embodiments of the disclosure, the AP may set the value D of the duration field of the MU-RTS-TXS TF in manners as follows.

1) When $T_{TXOP}=0$ and $T_{END-NAV}=0$, then $D=T_{SINGLE-MSDU}-T_{PPDU}$.

2) Otherwise, when $T_{TXOP}=0$ and $T_{END-NAV}>0$, then $D=\max(0, T_{END-NAV}-T_{PPDU})$.

3) Otherwise, when $T_{END-NAV}=0$, then $\min(T_{PENDING}, T_{TXOP}-T_{PPDU})\leq D\leq T_{TXOP}-T_{PPDU}$.

4) Otherwise, $T_{END-NAV}-T_{PPDU}\leq D\leq T_{TXOP-REMAINING}-T_{PPDU}$.

Optionally, the AP may set the duration field of the MU-RTS-TXS TF based on the manner described in the first embodiment, when the AP sets the duration field of the MU-RTS-TXS TF with the manner of multiple protection settings.

The manner of setting the duration field of the MU-RTS-TXS TF in the first embodiment considers frame exchange in the TXOP sharing procedure. In this case, the STA may set value of the duration field of the CTS frame according to existing manners of setting the duration field of the CTS frame, which may ensure accuracy of protection time of the CTS frame.

It should be noted that compared to existing manners of multiple protection settings, the manner of setting the duration field of the MU-RTS-TXS TF in the first embodiment considers frame exchange in the TXOP sharing procedure. Therefore, the manner of multiple protection settings in the embodiment of the disclosure may be considered as a modified manner of multiple protection settings, an adjusted manner of multiple protection settings, or an enhanced manner of multiple protection settings. To simplify description, it is still referred to as a manner of multiple protection settings.

In some embodiments, the AP sets the duration field of the MU-RTS-TXS TF by adopting the manner of multiple protection settings fixedly, that is, as long as the duration field of the MU-RTS-TXS TF is set according to the manner of setting the duration field of the MU-RTS-TXS TF described in the first embodiment, the STA may directly set the value of the duration field of the CTS frame according to the duration field of the MU-RTS-TXS TF without determining which manner of protection settings is used by the AP.

In some other embodiments, the manner of multiple protection settings is adopted by the AP for setting the duration field of the MU-RTS-TXS TF. This is selected by the AP from a plurality of protection setting manners for the duration field of the MU-RTS-TXS TF.

In some embodiments of the disclosure, S220 may include the following operations.

The first STA acquires first time information from the duration field of the MU-RTS-TXS TF.

The time information indicated by the duration field in the CTS frame is set according to the first time information and a first time duration. The first time duration is determined according to a time duration from an end time of a PPDU carrying the MU-RTS-TXS TF to an end time of a PPDU carrying the CTS frame. The first time duration may be a sum of a Short InterFrame Space (SIFS) and a time duration for sending CTS.

For example, the first STA sets time information obtained by subtracting the first time duration from the first time information as the time information indicated by the duration field in the CTS frame.

That is, the first STA may set the value of the duration field in the CTS frame according to a formula as follows.

$$\text{Time[Duration field of CTS]}=\text{Time[Duration field of MU-RTS TXS TF]}-\text{SIFS}-\text{Time[CTS]}.$$

Time[Duration field of CTS] indicates the value of the duration field of the CTS frame, Time[Duration field of MU-RTS TXS TF] indicates the value of the duration field of the MU-RTS TXS TF, and Time[CTS] indicates duration of the CTS frame.

Figure 8:
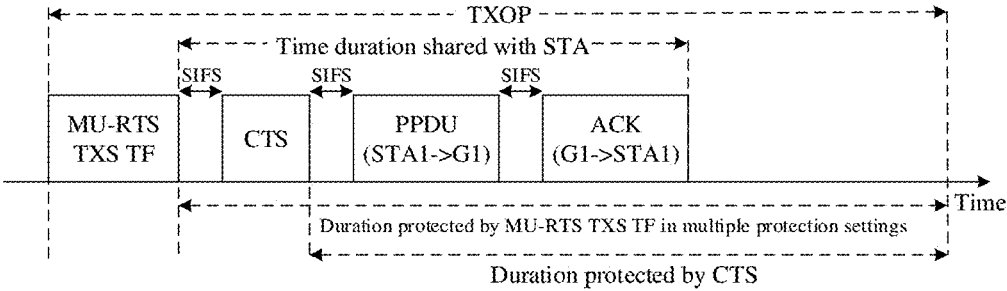
FIG. 8 is a schematic diagram of a time duration protected by a MU-RTS TXS TF or a CTS frame in multiple protection settings according to an embodiment of the disclosure.

As shown in FIG. 8, according to the manner of setting the duration field in the first embodiment, a range which may be protected by the MU-RTS TXS TF sent by the AP is from an end time of sending the MU-RTS TXS TF to an end time of TXOP. A range which may be protected by the CTS frame replied by the non-AP STA is from an end time of sending CTS to the end time of TXOP, and a difference between the two end times is the first time duration.

Second Embodiment

The duration field of the MU-RTS-TXS TF is set as a total time duration information shared by the AP with the at least one STA.

In some embodiments, the AP sets the duration field of the MU-RTS-TXS TF as the total time duration information shared by the AP with the at least one STA, when the AP sets the duration field of the MU-RTS-TXS TF with the manner of single protection settings.

Based on such setting manner, the first STA sets the value of the duration field of the CTS frame according to existing manners of setting the duration field of the CTS frame, that is, sets the duration field of the CTS according to the duration field of the MU-RTS-TXS TF, so that the CTS frame may be protected until an end time of sharing time of the AP.

In some embodiments of the disclosure, S220 may include the following operations.

The first STA acquires second time information from the duration field of the MU-RTS-TXS TF.

The time information indicated by the duration field in the CTS frame is determined according to the second time information and a first time duration. The first time duration is determined according to a time duration from an end time of a PPDU carrying the MU-RTS-TXS TF to an end time of a PPDU carrying the CTS frame. The first time duration may include a sum of a SIFS and a time duration for sending CTS.

For example, the first STA sets time information obtained by subtracting the first time duration from the second time information as the time information indicated by the duration field in the CTS frame.

That is, the first STA may set the value of the duration field in the CTS frame according to a formula as follows.

$$\text{Time[Duration field of CTS]} = \text{Time[Duration field of MU-RTS TS TF]} - \text{SIFS} - \text{Time[CTS]}$$

Time[Duration field of CTS] indicates the value of the duration field of the CTS frame, Time[Duration field of MU-RTS TXS TF] indicates the value of the duration field of the MU-RTS TXS TF, and Time[CTS] indicates duration of the CTS frame.

Figure 9:
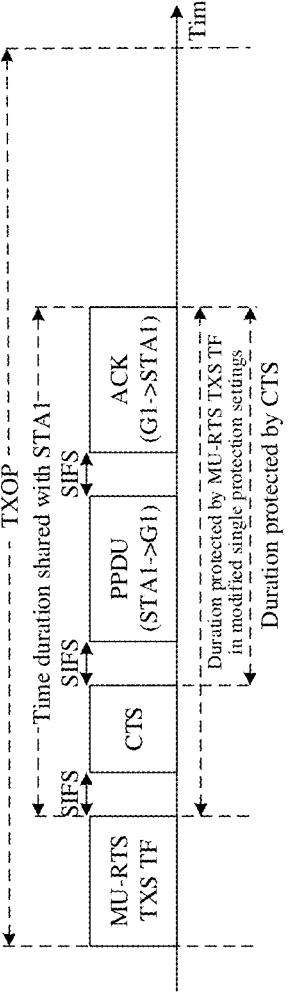
FIG. 9 is a schematic diagram of a time duration protected by a MU-RTS TXS TF or a CTS frame in single protection settings according to an embodiment of the disclosure.

In case of a single-user scenario, as shown in FIG. 9, the AP shares a part of time domain resources of TXOP with STA1. According to the manner of setting the duration field in the second embodiment, a range which may be protected by the MU-RTS TXS TF sent by the AP is from an end time of the MU-RTS TXS TF to an end time of the time shared by the AP with STA1. A range which may be protected by the CTS frame replied by STA1 is from an end time of CTS to the end time of the time shared by the AP with STA1, and a difference between the two end times is the first time duration.

Figure 10:
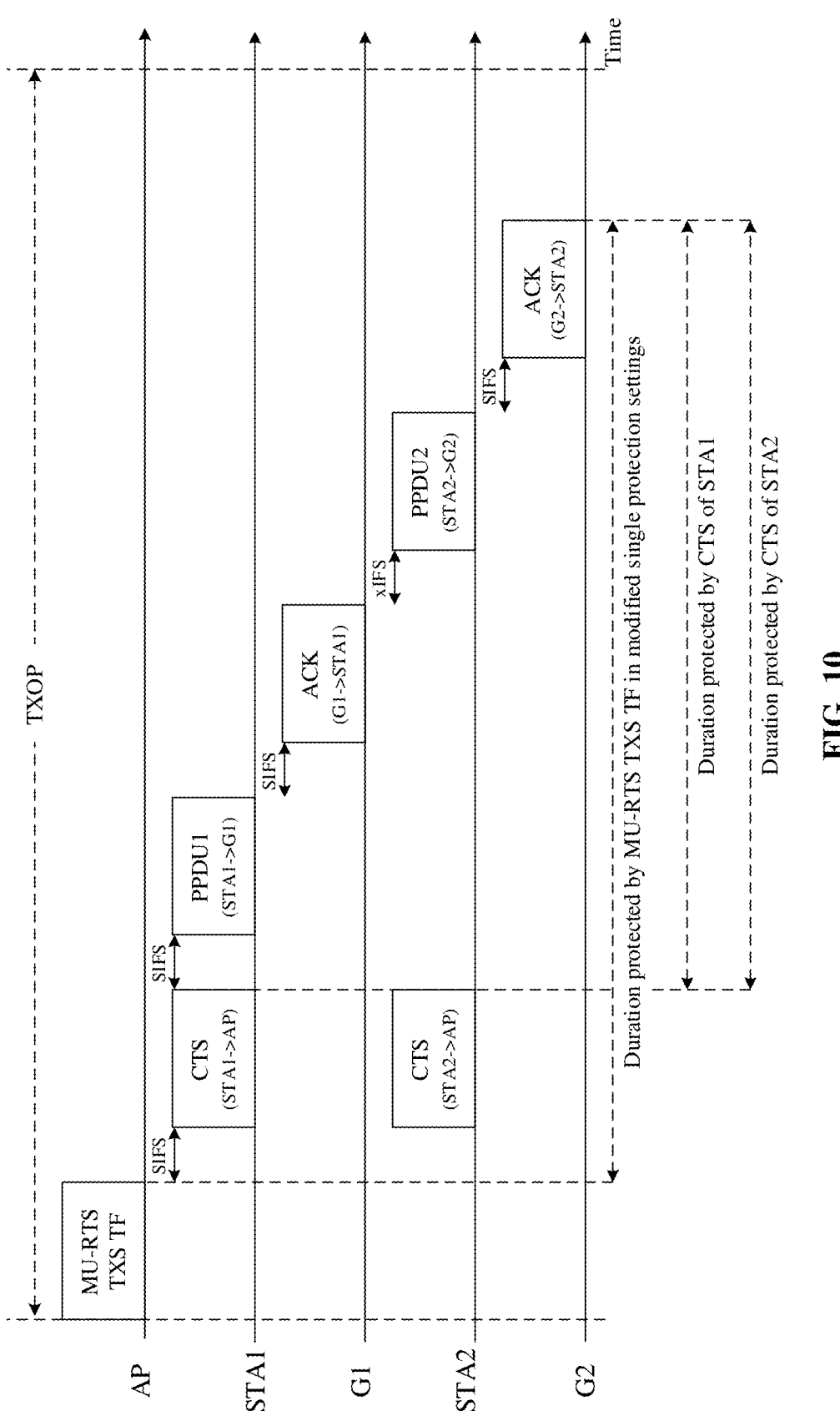
FIG. 10 is a schematic diagram of a protection time duration of a CTS frame of each STA when an AP shares TXOP with multiple STAs in single protection settings.

In case of a multiple-user scenario, as shown in FIG. 10, the AP shares a part of time domain resources of TXOP with STA1 and STA2. According to the manner of setting the duration field in the second embodiment, a range which may be protected by the MU-RTS TXS TF sent by the AP is from an end time of the MU-RTS TXS TF to an end time of the time shared by the AP with STA1 and STA2. A range which may be protected by the CTS frame replied by STA1 is from the end time of the CTS frame to the end time of the time shared by the AP with STA1 and STA2, and a difference between the two end times is the first time duration. A range which may be protected by the CTS frame replied by STA2 is from the end time of the CTS frame to the end time of the time shared by the AP with STA1 and STA2, and a difference between the two end times is the first time duration. That is, based on the second embodiment, end times of protection times of CTS frames of multiple STAs are the same.

In some embodiments of the disclosure, the AP sets the duration field of the MU-RTS-TXS TF as the total time information shared by the AP with the at least one STA when the AP sets the duration field of the MU-RTS-TXS TF with the manner of single protection settings, and the AP may set the duration field of the MU-RTS-TXS TF according to the manner in the first embodiment when the AP sets the duration field of the MU-RTS-TXS TF with the manner of multiple protection settings.

In some embodiments, the common information (Common Info) field or the user information (User Info) field in the MU-RTS-TXS TF is configured to carry time information shared by the AP with the at least one STA.

Figure 11:
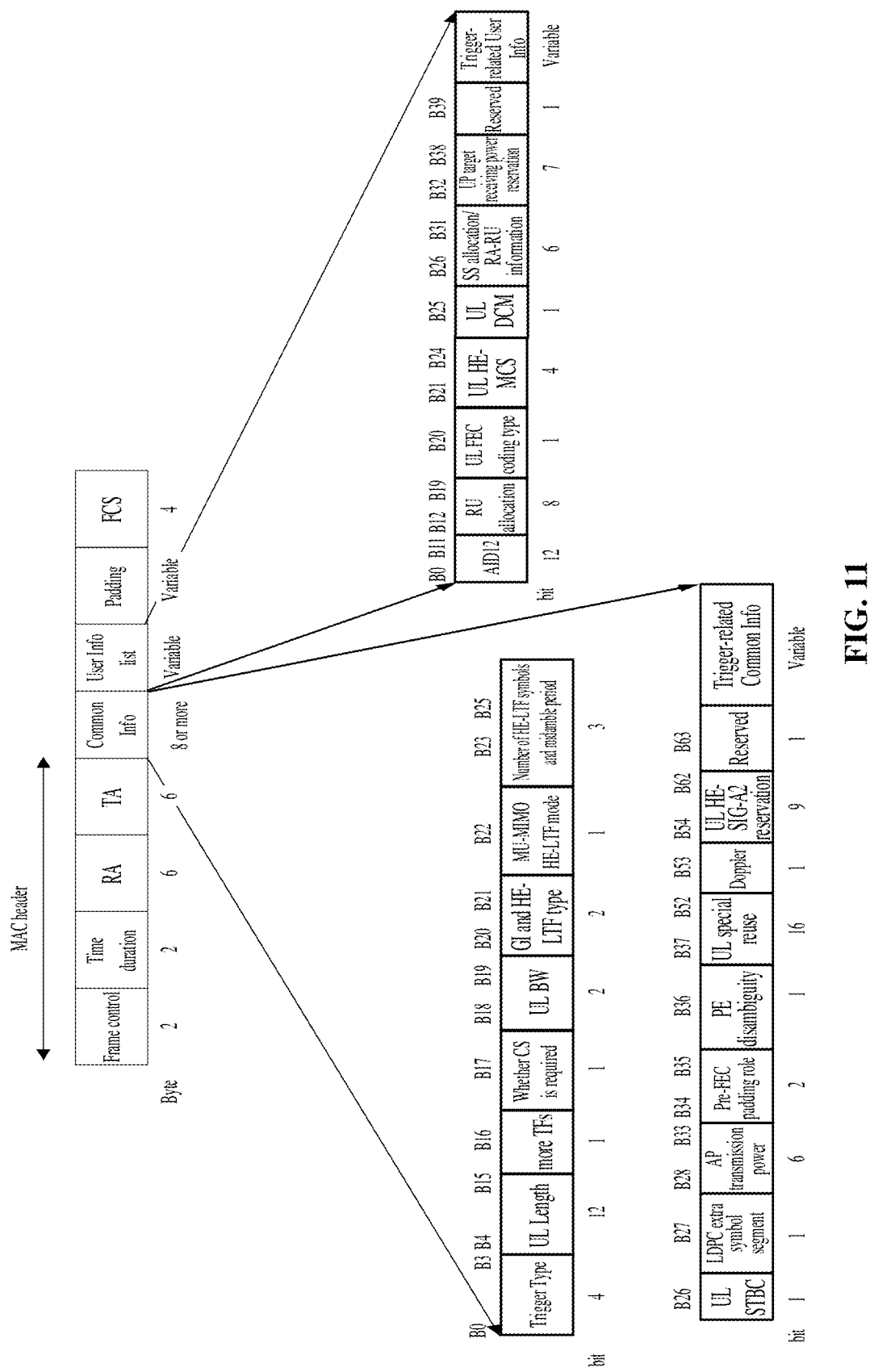
FIG. 11 is a schematic diagram of a Trigger Frame (TF) according to the disclosure.

FIG. 11 is a schematic diagram of a frame format of a TF, which includes fields as follows: frame control (occupying 2 bytes), time duration (occupying 2 bytes), Receiving Address (RA) (occupying 6 bytes), Transmission Address (TA) (occupying 6 bytes), Common Info (occupying 8 or more bytes), User Info list (occupying a variable number of bytes), padding (occupying a variable number of bytes), Frame Check Sequence (FCS) (occupying 4 bytes).

The frame control field, the duration field, the RA field and the TA field form a MAC header.

As shown in FIG. 11, the Common Info field includes subfields as follows: Trigger Type (occupying 4 bits), uplink (UL) Length (occupying 12 bits), more TFs (occupying 1 bit), whether Carrier Sense (CS) is required (occupying 1 bit), UL BandWidth (BW) (occupying 2 bits), Guard Interval (GI) and High Efficiency Long Training Field (HE-LTF) type (occupying 2 bits), Multiple-User multiple-in multiple-out (MU-MIMO) HE-LTF mode (occupying 1 bit), number of HE-LTF symbols and midamble period (occupying 3 bits), UL Space Time Block Code (STBC) (occupying 1 bit), Low-Density Parity Check (LDPC) extra symbol segment (occupying 1 bit), AP transmission power (occupying 6 bits), Pre-Forward Error Correction (Pre-FEC) padding role (occupying 2 bits), Packet Extension (PE) disambiguity (occupying 1 bit), UL special reuse (occupying 16 bits), doppler (occupying 1 bit), UL High Efficiency-SINGAL field-A2 (HE-SIG-A2) reservation (occupying 9 bits), reserved (occupying 1 bit), trigger-related Common Info (occupying a variable number of bits).

As shown in FIG. 11, the User Info list field includes subfields as follows: Association Identifier (AID) 12 (occupying 12 bits), RU allocation (occupying 8 bits), UL Forward Error Correction (FEC) coding type (occupying 1 bit), UL High Efficiency Modulation and Coding Scheme (HE-MCS) (occupying 4 bits), UL Dual Carrier Modulation (DCM) (occupying 1 bit), Spatial Streams (SS) allocation/Random Access Resource Unit (RA-RU) information (occupying 6 bits), UP target receiving power (occupying 7 bits), reserved (occupying 1 bit), trigger-related User Info (occupying a variable number of bits).

Figure 12:
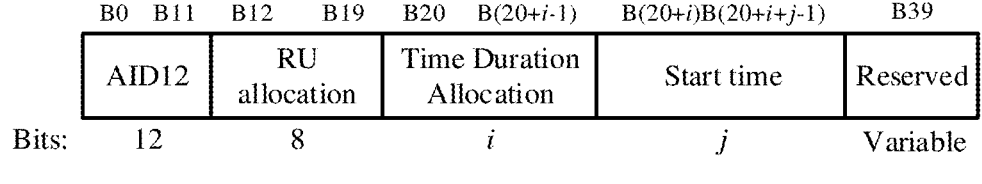
FIG. 12 is a schematic diagram of a user information (User Info) field format of a MU-RTS TXS TF according to an embodiment of the disclosure.

As shown in FIG. 12, it is an exemplary diagram of a format of a User Info field when a TF is defined as the MU-RTS TXS TF. As shown in FIG. 12, the User Info field includes subfields as follows: AID12 (occupying 12 bits), RU allocation (occupying 8 bits), Time Duration Allocation (occupying i bits), Start time (occupying j bits), reservation (occupying a variable number of bits).

As an example, in case of a single-user scenario, the at least one STA includes one STA, and time information shared by the AP with the one STA is carried by a User Info field corresponding to the one STA and/or the Common Info field in the MU-RTS-TXS TF. For example, the time information is carried through the UL Length subfield in the Common Info field of the MU-RTS-TXS TF or through the Time Duration Allocation subfield in the User Info field.

As an example, in case of a multiple-user scenario, the at least one STA includes multiple STAs, and the time information shared by the AP with the at least one STA is indicated by one of the following manners.

First manner: total time duration information shared by the AP with multiple STAs.

Second manner: time duration information shared by the AP with each of multiple STAs.

Third manner: a piece of reference time duration information and multiple pieces of relative time duration information, the reference time length information is configured to indicate reference time durations allocated by the AP to multiple STAs, and the multiple pieces of relative time length information correspond to multiple STAs one-to-one and are configured to indicate time offsets allocated by the AP to the STAs relative to the reference time durations.

Fourth manner: a piece of reference time length information and multiple pieces of relative time length information, the reference time length information is configured to indicate a reference time duration allocated by the AP to a single STA, and the multiple pieces of relative time length information correspond to multiple STAs one-to-one and are configured to indicate a time offset allocated by the AP to the STA relative to a corresponding reference time length.

Optionally, in the third manner, the reference time length information may be a basic time duration for multiple STAs, and the relative time duration corresponding to each STA may be an additional time duration shared by the AP with each STA.

Optionally, in the fourth manner, the reference time duration information may be a basic time duration for single STA, that is, the basic time duration corresponding to each STA is the same, and the relative time duration corresponding to each STA may be an additional time duration shared by the AP with each STA. What different from the third manner is that the reference time duration information in the third manner may be considered to be n times the reference time duration information in the fourth manner, here n is a number of multiple STAs. In some embodiments, in case of the first manner, the total time duration information shared by the AP with multiple STAs is indicated by the Common Info field in the MU-RTS-TXS TF.

In some embodiments, the AP carries the total time duration information shared by the AP with multiple STAs through the UL Length subfield in the Common Info field, then the value of the duration field of the MU-RTS-TXS TF is equal to value of the UL Length subfield in the Common Info field of the MU-RTS-TXS TF. That is, Time[Duration field of MU-RTS TXS TF]=Time[UL Length subfield of Common Info field]. Time[Duration field of MU-RTS TXS TF] indicates the value of the duration field of the MU-RTS TXS TF, and Time[UL Length subfield of Common Info field] indicates the value of the UL Length subfield in the Common Info field of the MU-RTS TXS TF.

In some embodiments, in case of the second manner, the time duration information shared by the AP with each of multiple STAs is indicated by User Info fields in the MU-RTS-TXS TF corresponding to multiple STAs.

In some embodiments, the AP carries the time duration information shared by the AP with each STA through the Time Duration Allocation subfield in the User Info field corresponding to each STA, then the value of the duration field of the MU-RTS-TXS TF is equal to the sum of values of the Time Duration Allocation subfields in all User Info fields of the MU-RTS-TXS TF.

That is, Time[Duration field of MU-RTS TXS TF]=

$$
\text{Time}[\text{Duration field of } MU\text{-}RTS\ TXS\ TF] = \\
\sum\nolimits_{i=0}^{n} \text{Time}[\text{Time Duration Allocation subfield of User Info field } i].
$$

Time[Duration field of MU-RTS TXS TF] indicates the value of the duration field of the MU-RTS TXS TF, and Time[Time Duration Allocation subfield of User Info field i]

indicates the value of the Time Duration Allocation subfield in an i-th User Info field of the MU-RTS-TXS TF, here n is a number of multiple STAs.

In some embodiments, in case of the third manner, the reference time duration information is indicated by the Common Info field in the MU-RTS-TXS TF, and the multiple pieces of relative time duration information are indicated by the User Info fields in the MU-RTS-TXS TF corresponding to multiple STAs.

In some embodiments, the AP carries reference time information shared by the AP with multiple STAs through the UL Length subfield in the Common Info field, and carries the relative time length information shared by the AP with each STA through the Time Duration Allocation subfield in the User Info field. Then, the value of the duration field of the MU-RTS-TXS TF is equal to the sum of the value of the UL Length subfield in the Common Info field of the MU-RTS-TXS TF and the values of the Time Duration Allocation subfields in all User Info fields of the MU-RTS-TXS TF. That is, $$
\text{Time}[\text{Duration field of } MU\text{-}RTS\ TXS\ TF] = \\
\text{Time}[UL\ \text{Length subfield of Common Info field}] + \\
\sum\nolimits_{i=0}^{n} \text{Time}[\text{Time Duration Allocation subfield of User Info field } i].
$$

Time[Duration field of MU-RTS TXS TF] indicates the value of the duration field of the MU-RTS TXS TF, Time[UL Length subfield of Common Info field] indicates the value of the UL Length subfield in the Common Info field of the MU-RTS TXS TF, and Time[Time Duration Allocation subfield of User Info field i] indicates the value of the Time Duration Allocation subfield in an i-th User Info field of the MU-RTS TXS TF, here n is a number of multiple STAs.

In some embodiments, in case of the fourth manner, the reference time duration information is indicated by the Common Info field in the MU-RTS-TXS TF, and multiple relative time duration information are indicated by the User Info fields in the MU-RTS-TXS TF corresponding to multiple STAs.

In some embodiments, the AP carries reference time information shared by the AP with single STA through the UL Length subfield in the Common Info field, and carries the relative time duration information shared by the AP with each STA through the Time Duration Allocation subfield in the User Info field. Then, the value of the duration field of the MU-RTS-TXS TF, the value of the UL Length subfield in the Common Info field of the MU-RTS-TXS TF and the values of the Time Duration Allocation subfields in all User Info fields of the MU-RTS-TXS TF satisfies a relationship as follows: Time[Duration field of MU-RTS TXS TF]=n*Time[UL Length subfield of Common Info $$
\text{Time}[\text{Duration field of } MU\text{-}RTS\ TXS\ TF] = \\
n * \text{Time}[UL\ \text{Length subfield of Common Info field}] + \\
\sum\nolimits_{i=0}^{n} \text{Time}[\text{Time Duration Allocation subfield of User Info field } i].
$$

Time[Duration field of MU-RTS TXS TF] indicates the value of the duration field of the MU-RTS TXS TF, Time[UL Length subfield of Common Info field] indicates the value of the UL Length subfield in the Common Info field of the MU-RTS TXS TF, and Time[Time Duration Allocation subfield of User Info field i] indicates the value of the Time Duration Allocation subfield in an i-th User Info field of the MU-RTS TXS TF, here n is the number of the multiple STAs. It should be understood that the above manners of indicating the time information shared by the AP with at least one STA and carrying the same in the MU-RTS TXS TF are only examples, and the disclosure is not limited thereto. Other indication and carrying manners reasonably derived from the examples of the disclosure fall within the scope of protection of the disclosure.

Third Embodiment

In some embodiments of the disclosure, the AP carries time information shared by the AP with at least one STA through the first indication information.

In the third embodiment, the first STA may set the duration field of the CTS frame according to the first indication information.

In the third embodiment, the AP may set the duration field of the MU-RTS-TXS TF according to existing setting manners when the AP sets the duration field of the MU-RTS-TXS TF. More specifically, the AP may set the duration field of the MU-RTS-TXS TF with existing setting manners when the AP uses the manner of single protection settings.

In some embodiments, the time information shared by the AP with at least one STA is indicated by the first indication information, in case that the AP uses the manner of single protection settings; and the duration field of the MU-RTS-TXS TF is set by the setting manner in the first embodiment, in case that the AP uses the manner of multiple protection settings, that is, the duration field in the MU-RTS-TXS TF carries related information of sharing time of the AP.

Furthermore, in the manner of single protection settings, the AP may set the duration field of the MU-RTS TXS TF in a manner as follows: Time[Duration field of MU-RTS TXS TF]=Time[CTS]+Time[applicable IFSs]+Time[pending PPDU]+Time[one ACK frame or BA frame (if required)]+Time[NDP (if required)]+Time[explicit feedback (if required)].

Further, the operation of setting, by the first STA, the duration field of the CTS frame according to the first indication information may include the following operations.

The first STA acquires the third time information according to the first indication information.

The time information indicated by the duration field in the CTS frame is determined according to the third time information and a first time duration. The first time duration is determined according to a time duration from an end time of a PPDU carrying the MU-RTS-TXS TF to an end time of a PPDU carrying the CTS frame.

For example, the first STA sets the time information obtained by subtracting the first time duration from the third time information as the time information indicated by the duration field in the CTS frame.

That is, the first STA may set the value of the duration field in the CTS frame in a manner as follows: Time [Duration field of CTS]=Time[First indication information]−SIFS−Time[CTS].

Time[First indication information] indicates the time information determined according to the first indication information.

In some embodiments of the disclosure, the first indication information is carried by a Common Info field and/or a User Info field in the MU-RTS-TXS TF. That is, the AP may carry the time information shared by the AP with at least one STA through the Common Info field and/or the User Info field in the MU-RTS-TXS TF.

In some embodiments of the disclosure, the first indication information is configured to indicate total time duration information shared by the AP with the at least one STA. In this case, the AP may carry the total time duration information shared by the AP with the at least one STA through the Common Info field in the MU-RTS-TXS TF.

In some other embodiments of the disclosure, the first indication information is configured to indicate time information shared by the AP with each of the at least one STA. That is, the time information shared by the AP with each of the at least one STA is indicated independently.

In some implementations, the time information shared by the AP with each of the at least one STA includes at least one of: start time information and time duration information shared by the AP with each of the at least one STA.

That is, the AP may indicate the time information shared with each STA by way of indicating the start time and the time duration.

For example, in case of a single-user scenario, the AP may carry the start time information and the time duration information shared by the AP with the one STA through the Common Info field in the MU-RTS-TXS TF; or, carry the start time information and the time length information shared by the AP with the one STA through the User Info field in the MU-RTS-TXS TF corresponding to the STA.

For another example, in case of a multiple-user scenario, the AP may carry the start time information and the time duration information shared by the AP with each STA through the User Info field corresponding to each STA.

As an example, the AP carries the start time information shared by the AP with the STA through the Start time subfield in the User Info field, and carries the time duration information shared by the AP with the STA through the Time Allocation Duration subfield.

Then, when the STA sets the value of the duration field in the CTS frame according to the first indication information, the STA may set the value of the duration field in the CTS frame according to a formula as follows: Time[Duration field of CTS]=Time[Start time subfield+Time Allocation Duration subfield]−SIFS−Time[CTS].

Time[Start time subfield+Time Allocation Duration subfield] indicates time resources shared by the AP with the STA and determined according to the Start time subfield and the Time Allocation Duration subfield.

Figure 13:
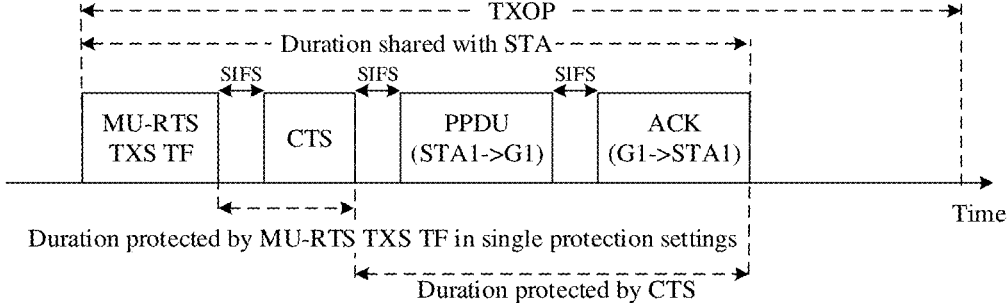
FIG. 13 is a schematic diagram of a time duration protected by a CTS frame or a duration field in a MU-RTS TXS TF when an AP shares TXOP with one STA in single protection settings.

In the single-user scenario, as shown in FIG. 13, the duration field based on the MU-RTS-TXS TF may only be protected until the end time of the CTS frame, while the CTS frame determined based on the first indication information may be protected until the end time of sharing time of the AP.

Figure 14:
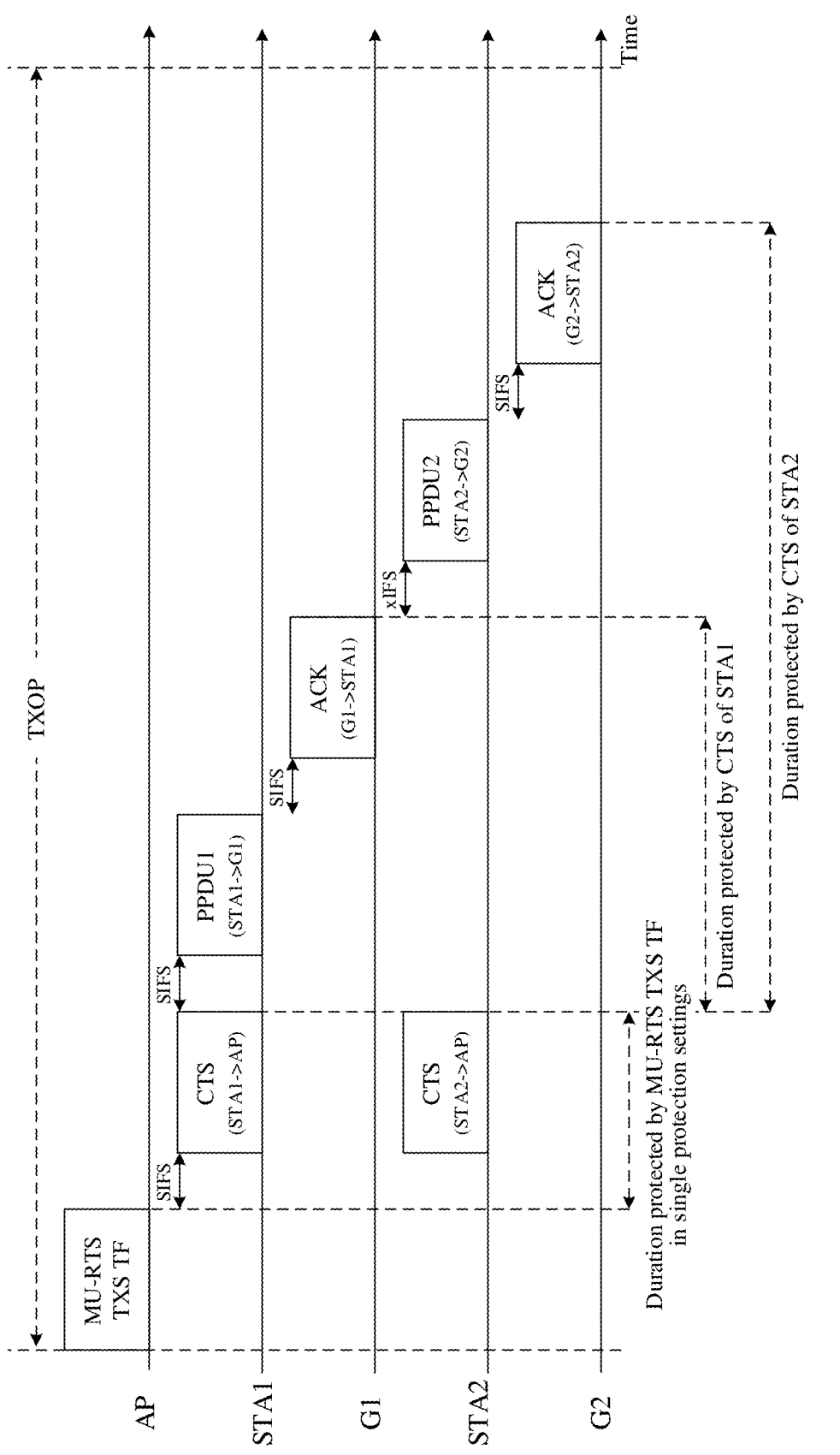
FIG. 14 is a schematic diagram of a protection time duration of a CTS frame of each STA when an AP shares TXOP with multiple STAs in single protection settings.

In the multiple-user scenario, as shown in FIG. 14, the duration field based on the MU-RTS-TXS TF may only be protected until the end time of the CTS frame, while the CTS frame determined based on the first indication information may be protected until the end time of time resources shared by the AP with each STA.

In some other implementations, the time information shared by the AP with each of the at least one STA includes at least one of:

a piece of reference time duration information configured to indicate reference time lengths allocated by the AP to multiple STAs;

the start time information shared by the AP with each of the at least one STA; and the relative time duration information shared by the AP with each of the at least one STA. The relative time length information is configured to indicate a time offset, allocated by the AP to each of the at least one STA, relative to the reference time length.

As an example, the AP may carry the reference time duration information through the Common Info field, for example, carry the reference time duration information through the UL Length subfield in the Common Info field.

As an example, the AP may carry the start time information and the relative time duration information shared by the AP with each STA through the User Info field of each STA. For example, the AP carries the start time information shared by the AP with the STA through the Start time subfield in the User Info field, and carries the relative time duration information shared by the AP with the STA through the Time Allocation Duration subfield.

Then, when the STA sets the value of the duration field in the CTS frame according to the first indication information, the STA may set the value of the duration field in the CTS frame according to a formula as follows:

Time[Duration field of CTS]=Time[UL Length subfield+Start time subfield+Time Allocation Duration subfield]−SIFS−Time[CTS].

Time[UL Length subfield+Start time subfield+Time Allocation Duration subfield] indicates time resources shared by the AP with the STA and determined according to the UL Length subfield, the Start time subfield and the Time Allocation Duration subfield.

In some embodiments of the disclosure, the method 200 further includes the following operations.

The first STA determines a manner of protection settings used by the AP to set the duration field of the MU-RTS-TXS TF, according to the time information indicated by the duration field of the MU-RTS-TXS TF and/or the time information indicated by the first indication information.

In some embodiments, the implementation in the third embodiment is used when the AP uses the manner of single protection settings, and the setting manner in the first embodiment is used when the AP uses the manner of multiple protection settings. In this case, the STA needs to determine the manner of protection settings used by the AP, to correctly set the duration field of the CTS frame.

For example, it is determined that a manner of multiple protection settings is used by the AP to set the duration field of the MU-RTS-TXS TF, when a time duration indicated by the duration field equal to or greater than a time duration indicated by the first indication information.

For another example, it is determined that a manner of single protection settings is used by the AP to set the duration field of the MU-RTS-TXS TF, when the time length indicated by the duration field less than the time duration indicated by the first indication information.

Further, the first STA determines, according to the manner of protection settings used by the AP to set the duration field of the MU-RTS-TXS TF, that the time information indicated by the duration field in the CTS frame is set whether according to the duration field of the MU-RTS-TXS TF or according to the first indication.

For example, when it is determined that the AP uses the manner of single protection settings, in this case, the AP carries the time information shared by the AP with the STA through the first indication information, while the duration field of MU-RTS-TXS TF uses existing setting manners, that is, it does not consider frame exchange in TXOP sharing.

Therefore, the STA may set the duration field of the CTS frame according to the first indication information.

For another example, when it is determined that the AP uses the manner of multiple protection settings, in this case, the AP sets the duration field of the MU-RTS-TXS TF with the setting manner in the first embodiment. Therefore, the STA may set the duration field of the CTS frame according to the duration field of the MU-RTS-TXS TF.

In summary, when multiple protection settings is used, the AP may set the duration field of the MU-RTS-TXS TF according to the manner described in the first embodiment, and correspondingly, the STA may set the duration field in the CTS frame according to the duration field of the MU-RTS-TXS TF. That is, the STA may use existing rules of setting the duration field in the CTS frame, to protect the sent CTS frame until the end time of TXOP.

When single protection settings is used, the AP may set the duration field of the MU-RTS-TXS TF according to the manner described in the second embodiment, and correspondingly, the STA may set the duration field in the CTS frame according to the duration field of the MU-RTS-TXS TF. That is, the STA may use existing rules of setting the duration field in the CTS frame, to protect the sent CTS frame until an end time of the time shared by the AP with the STA.

In single protection settings, the AP may set the first indication information of the MU-RTS-TXS TF according to the manner described in the third embodiment, that is, the time information shared by the AP with the STA is carried by the first indication information, without modifying the manner of setting the duration field in the manner of single protection settings. In this case, the STA may set the duration field in the CTS frame according to the first indication information of the MU-RTS-TXS TF, so that the protection time of the sent CTS frame may last until the end time of the time shared by the AP with the STA.

It should be understood that application scenarios of the first embodiment, the second embodiment and the third embodiment as shown above are only examples, and the embodiments of the disclosure are not limited thereto. For example, in some embodiments, no matter which manner of protection settings is used by the AP, the duration field of the MU-RTS-TXS TF is set with the manner in the first embodiment, and correspondingly, the STA may set the duration field in the CTS frame according to the duration field of the MU-RTS-TXS TF. In some other embodiments, no matter which manner of protection settings is used by the AP, the duration field of the MU-RTS-TXS TF is set with the manner in the second embodiment, and correspondingly, the STA may set the duration field in the CTS frame according to the duration field of the MU-RTS-TXS TF. In some other embodiments, no matter which manner of protection settings is used by the AP, the first indication information of the MU-RTS-TXS TF is set with the manner in the third embodiment, and correspondingly, the STA may set the duration field in the CTS frame according to the first indication information of the MU-RTS-TXS TF.

In the embodiments of the disclosure, a manner of setting a duration field in the ACK frame or BA frame in the triggered TXOP sharing procedure also needs to be adjusted adaptively, to adapt to the triggered TXOP sharing procedure.

For example, after receiving the MU-RTS-TXS TF sent by the AP, the first STA may confirm the time information shared by the AP with the STA, and further, the first STA may send a first PPDU to the AP or other STAs (such as a second STA), and after receiving the first PPDU, the AP or the second STA may set value of the duration field in the ACK frame or BA frame for confirming the first PPDU, according to a duration field in the first PPDU. For example, value of the duration field of the first PPDU minus a second duration may be used as the value of the duration field in the ACK frame or BA frame, the second duration is a time duration from an end time of the first PPDU to an end time of the ACK frame or BA frame.

In some embodiments, the first PPDU may include at least one of:

an EHT TB PPDU, such as an EHT TB PPDU in single protection settings;

a HE TB PPDU, such as a HE TB PPDU in single protection settings; or a non-TB PPDU.

For example, as shown in FIG. 14, after receiving the MU-RTS-TXS TF from the AP, the STA1 may confirm the time information shared by the AP with STA1, and further, STA1 may send a PPDU1 to the AP or other STAs, such as G1, and then, after receiving the PPDU1, the AP or other STAs may set the value of the duration field in the ACK frame or BA frame for confirming the PPDU1, according to a duration field in the PPDU1.

Therefore, based on the technical solutions of the disclosure, the MU-RTS-TXS TF set by the AP may be protected in time resources shared by the AP with the STA, and based on the setting manner of the AP, the CTS frame set by the STA may be protected until the time resources shared by the AP with the STA, thereby avoiding a problem that other users occupy TXOP time resources shared by the AP.

The method embodiments of the disclosure are described in detail above with reference to FIG. 7 to FIG. 14, and the device embodiments of the disclosure are described in detail below with reference to FIG. 15 to FIG. 19. It should be understood that the device embodiments and the method embodiments correspond to each other, similar descriptions may refer to the method embodiments.

Figure 15:
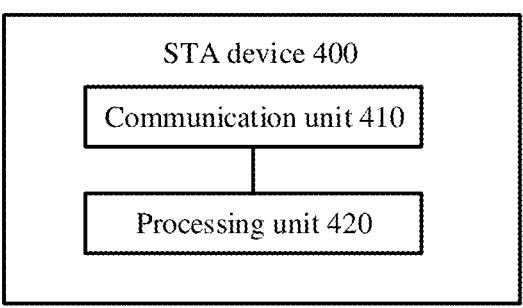
FIG. 15 is a schematic block diagram of an STA device according to an embodiment of the disclosure.

FIG. 15 shows a schematic block diagram of a STA device 400 according to an embodiment of the disclosure. As shown in FIG. 15, the STA device 400 includes a communication unit 410 and a processing unit 420.

The communication unit 410 is configured to receive a MU-RTS-TXS TF sent by an AP device.

The processing unit 420 is configured to set time information indicated by a duration field in a CTS frame according to time information indicated by a duration field in the MU-RTS-TXS TF and/or first indication information. The first indication information is configured to indicate time information for the AP device to share a part of an obtained TXOP with at least one STA device.

In some embodiments, the time information indicated by the duration field in the MU-RTS-TXS TF is determined according to at least one of:

an estimated time required for an allowed transmission in a triggered TXOP sharing procedure; or an estimated time required for transmission of an allowed frame exchange sequence defined in TXOP limits.

In some embodiments, the allowed transmission in the triggered TXOP sharing procedure includes at least one of:

transmission of an uplink pending MPDU in the triggered TXOP sharing procedure;

transmission of a peer-to-peer pending MPDU in a TXOP sharing mode 2 in the triggered TXOP sharing procedure; or transmission of an EHT sounding NDP.

In some embodiments, the transmission of the allowed frame exchange sequence defined in TXOP limits includes at least one of:

transmission of an EHT MU PPDU;

transmission of an EHT TB PPDU;

transmission of the MU-RTS-TXS TF; or transmission of the CTS frame.

In some embodiments, the processing unit 420 is further configured to:

acquire first time information from the duration field of the MU-RTS-TXS TF; and set the time information indicated by the duration field in the CTS frame according to the first time information and a first time duration. The first time duration is determined according to the time duration from an end time of a PPDU carrying the MU-RTS-TXS TF to an end time of a PPDU carrying the CTS frame.

In some embodiments, the processing unit 420 is further configured to:

set time information obtained by subtracting the first time duration from the first time information as the time information indicated by the duration field in the CTS frame.

In some embodiments, the processing unit 420 is further configured to:

set the time information indicated by the duration field in the CTS frame according to the time information indicated by the duration field in the MU-RTS-TXS TF, in case that the AP device sets the duration field of the MU-RTS-TXS TF with a manner of multiple protection settings.

In some embodiments, the AP device sets the duration field of the MU-RTS-TXS TF with the manner of multiple protection settings fixedly in a triggered TXOP sharing.

In some embodiments, the manner of multiple protection settings is selected by the AP device from a plurality of protection setting manners for the duration field of the MU-RTS-TXS TF, and the plurality of manners of protection setting manners include a manner of single protection settings and the manner of multiple protection settings.

In some embodiments, the duration field of the MU-RTS-TXS TF is set as a total time duration information shared by the AP device with the at least one STA device.

In some embodiments, the processing unit 420 is further configured to:

acquire second time information from the duration field of the MU-RTS-TXS TF; and determine the time information indicated by the duration field in the CTS frame according to the second time information and a first time duration. The first time duration is determined according to a duration from an end time of a PPDU carrying the MU-RTS-TXS TF to an end time of a PPDU carrying the CTS frame.

In some embodiments, the processing unit 420 is further configured to:

set time information obtained by subtracting the first time duration from the second time information as the time information indicated by the duration field in the CTS frame.

In some embodiments, the processing unit 420 is further configured to:

set the time information indicated by the duration field in the CTS frame according to the time information indicated by the duration field in the MU-RTS-TXS TF, in case that the AP device sets the duration field of the MU-RTS-TXS TF with a manner of single protection settings.

In some embodiments, a Common Info field and/or a User Info field in the MU-RTS-TXS TF is configured to carry time information shared by the AP device with the at least one STA device.

In some embodiments, the at least one STA device includes one STA device, and time information shared by the AP device with the one STA device is carried by a User Info field corresponding to the one STA device and/or the Common Info field in the MU-RTS-TXS TF.

In some embodiments, the at least one STA device includes multiple STA devices, and the time information shared by the AP device with the at least one STA device is indicated by one of:

total time duration information shared by the AP device with multiple STA devices;

time duration information shared by the AP device with each of multiple STA devices; or a piece of reference time duration information and multiple pieces of relative time duration information, the reference time duration information is configured to indicate reference time durations allocated by the AP device to multiple STA devices, and the multiple pieces of relative time duration information correspond to multiple STA devices one-to-one and are configured to indicate time offsets allocated by the AP device to the STA devices relative to the reference time durations.

In some embodiments, the total time duration information shared by the AP device with multiple STA devices is indicated by the Common Info field in the MU-RTS-TXS TF.

The time duration information shared by the AP device with each of multiple STA devices is indicated by User Info fields in the MU-RTS-TXS TF corresponding to multiple STA devices.

The reference time duration information is indicated by the Common Info field in the MU-RTS-TXS TF, and multiple pieces of relative time duration information are indicated by the User Info fields in the MU-RTS-TXS TF corresponding to multiple STA devices.

In some embodiments, the processing unit 420 is further configured to:

acquire third time information according to the first indication information; and determine the time information indicated by the duration field in the CTS frame according to the third time information and a first time duration. The first time duration is determined according to a duration from an end time of a PPDU carrying the MU-RTS-TXS TF to an end time of a PPDU carrying the CTS frame.

In some embodiments, the processing unit 420 is further configured to:

set time information obtained by subtracting the first time duration from the third time information as the time information indicated by the duration field in the CTS frame.

In some embodiments, the first indication information is configured to indicate time information shared by the AP device with each of the at least one STA device.

In some embodiments, the time information shared by the AP device with each of the at least one STA device includes:

start time information and time duration information shared by the AP device with each of the at least one STA device.

In some embodiments, the time information shared by the AP device with each of the at least one STA device includes:

a reference time duration information configured to indicate reference time durations allocated by the AP device to multiple STA devices;

start time information shared by the AP device with each of the at least one STA device; and relative time duration information shared by the AP device with each of the at least one STA device. The relative time duration information is configured to indicate a time offset allocated by the AP device to each of the at least one STA device relative to the reference time duration.

In some embodiments, the first indication information is carried by a Common Info field and/or a User Info field in the MU-RTS-TXS TF.

In some embodiments, the processing unit 420 is further configured to:

determine a manner of protection settings used by the AP device to set the duration field of the MU-RTS-TXS TF, according to the time information indicated by the duration field of the MU-RTS-TXS TF and/or the time information indicated by the first indication information.

In some embodiments, the processing unit 420 is further configured to:

determine that the AP device sets the duration field of the MU-RTS-TXS TF with a manner of multiple protection settings, when a time duration indicated by the duration field equals to or greater than a time duration indicated by the first indication information; or determine that the AP device sets the duration field of the MU-RTS-TXS TF with a manner of single protection settings, when the time duration indicated by the duration field is less than the time duration indicated by the first indication information.

In some embodiments, the processing unit 420 is further configured to:

set, according to the manner of protection settings used by the AP device to set the duration field of the MU-RTS-TXS TF, the time information indicated by the duration field in the CTS frame according to the duration field of the MU-RTS-TXS TF and/or the first indication information.

In some embodiments, the processing unit 420 is further configured to:

set the time information indicated by the duration field in the CTS frame according to the first indication information, in case that the AP device sets the duration field of the MU-RTS-TXS TF with a manner of single protection settings; or set the time information indicated by the duration field in the CTS frame according to the duration field of the MU-RTS-TXS TF, in case that the AP device sets the duration field of the MU-RTS-TXS TF with a manner of multiple protection settings.

In some embodiments, the communication unit 410 is further configured to:

receive an ACK frame or a BA frame sent by a second STA device or the AP device. The ACK frame or the BA frame is configured to confirm an EHT TB PPDU sent by the STA device, and time information indicated by a duration field in the ACK frame or the BA frame is set according to time information indicated by a duration field in a frame in the EHT TB PPDU.

In some embodiments, the communication unit 410 is further configured to:

receive an ACK frame or a BA frame sent by a second STA device or the AP device. The ACK frame or the BA frame is configured to confirm a non-TB PPDU sent by the STA device, and time information indicated by a duration field in the ACK frame or the BA frame is set according to time information indicated by a duration field in a frame in the non-TB PPDU.

Optionally, in some embodiments, the above communication unit may be a communication interface or a transceiver, or an input/output (I/O) interface of a communication chip or a system-on-chip (SOC). The above processing unit may be one or more processors.

It should be understood that the STA device 400 according to the embodiment of the disclosure may correspond to the first STA in the method embodiments of the disclosure, and the above and other operations and/or functions of each unit in the STA device 400 are intended to implement corresponding processes of the first STA in the method 200 shown in FIG. 7 respectively, which are not elaborated here, for the sake of brevity.

Figure 16:
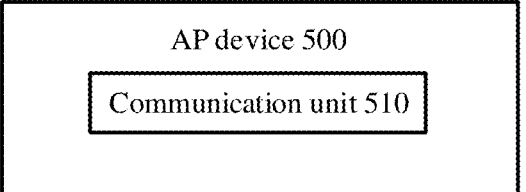
FIG. 16 is a schematic block diagram of a AP device according to an embodiment of the disclosure.

FIG. 16 is a schematic block diagram of an AP device according to an embodiment of the disclosure. The AP device 500 of FIG. 16 includes a communication unit 510.

The communication unit 510 is configured to send a MU-RTS-TXS TF to at least one STA device. Time information indicated by a duration field in the MU-RTS-TXS TF and/or a first indication information are/is used by the at least one STA device to set time information indicated by a duration field in a CTS frame. The first indication information is configured to indicate time information for the AP device to share a part of an obtained TXOP with the at least one STA device.

In some embodiments, the time information indicated by the duration field in the MU-RTS-TXS TF is determined according to at least one of:

an estimated time required for an allowed transmission in a triggered TXOP sharing procedure; or an estimated time required for transmission of an allowed frame exchange sequence defined in TXOP limits.

In some embodiments, the allowed transmission in the triggered TXOP sharing procedure includes at least one of:

transmission of an uplink pending MPDU in the triggered TXOP sharing procedure;

transmission of a peer-to-peer pending MPDU in a TXOP sharing mode 2 in the triggered TXOP sharing procedure; or transmission of an EHT sounding NDP.

In some embodiments, the transmission of the allowed frame exchange sequence defined in TXOP limits includes at least one of:

transmission of an EHT MU PPDU;

transmission of an EHT TB PPDU;

transmission of the MU-RTS-TXS TF; or transmission of the CTS frame.

In some embodiments, the AP device further includes a processing unit.

The processing unit is configured to set the time information indicated by the duration field in the MU-RTS-TXS TF according to the estimated time required for the allowed transmission in the triggered TXOP sharing procedure and/or the estimated time required for transmission of the allowed frame exchange sequence defined in TXOP limits, in case that the duration field of the MU-RTS-TXS TF is set with a manner of multiple protection settings.

In some embodiments, the AP device sets the duration field of the MU-RTS-TXS TF with the manner of multiple protection settings fixedly, in a triggered TXOP sharing.

In some embodiments, the manner of multiple protection settings is selected by the AP device from a plurality of protection setting manners for the duration field of the MU-RTS-TXS TF, and the plurality of protection setting manners include a manner of single protection settings and the manner of multiple protection settings.

In some embodiments, the duration field of the MU-RTS-TXS TF is set as a total time duration information shared by the AP device with the at least one STA device.

In some embodiments, the AP device further includes a processing unit.

The processing unit is configured to set the duration field of the MU-RTS-TXS TF as the total time duration information shared by the AP device with the at least one STA device, in case that the duration field of the MU-RTS-TXS TF is set with a manner of single protection settings.

In some embodiments, a Common Info field and/or a User Info field in the MU-RTS-TXS TF is configured to carry a time information shared by the AP device with the at least one STA device.

In some embodiments, the at least one STA device includes one STA device, and a time information shared by the AP device with the one STA device is carried by a User Info field corresponding to the one STA device and/or the Common Info field in the MU-RTS-TXS TF.

In some embodiments, the at least one STA device includes multiple STA devices, and the time information shared by the AP device with the at least one STA device is indicated by one of:

total time duration information shared by the AP device with multiple STA devices;

a time duration information shared by the AP device with each of multiple STA devices; or a piece of reference time duration information and multiple pieces of relative time duration information, the reference time duration information is configured to indicate reference time durations allocated by the AP device to multiple STA devices, and multiple pieces of relative time duration information correspond to multiple STA devices one-to-one and are configured to indicate time offsets allocated by the AP device to the STA devices relative to the reference time durations.

In some embodiments, the total time duration information shared by the AP device with multiple STA devices is indicated by the Common Info field in the MU-RTS-TXS TF.

The time duration information shared by the AP device with each of multiple STA devices is indicated by User Info fields in the MU-RTS-TXS TF corresponding to multiple STA devices.

The reference time duration information is indicated by the Common Info field in the MU-RTS-TXS TF, and multiple pieces of relative time duration information are indicated by the User Info fields in the MU-RTS-TXS TF corresponding to multiple STA devices.

In some embodiments, the first indication information is configured to indicate time information shared by the AP device with each of the at least one STA device.

In some embodiments, the time information shared by the AP device with each of the at least one STA device includes:

start time information and time duration information shared by the AP device with each of the at least one STA device.

In some embodiments, the time information shared by the AP device with each of the at least one STA device includes:

reference time duration information configured to indicate reference time durations allocated by the AP device to multiple STA devices;

start time information shared by the AP device with each of the at least one STA device; and relative time duration information shared by the AP device with each of the at least one STA device, the relative time duration information is configured to indicate a time offset allocated by the AP device to each of the at least one STA device relative to the reference time duration.

In some embodiments, the first indication information is carried by a Common Info field and/or a User Info field in the MU-RTS-TXS TF.

In some embodiments, the communication unit 510 is further configured to:

send an ACK frame or a BA frame to a first STA device. The ACK frame or the BA frame is configured to confirm an EHT TB PPDU sent by the first STA device, and time information indicated by a duration field in the ACK frame or the BA frame is set according to time information indicated by a duration field in a frame in the EHT TB PPDU.

In some embodiments, the communication unit 510 is further configured to:

send an ACK frame or a BA frame to a first STA device. The ACK frame or the BA frame is configured to confirm a non-TB PPDU sent by the first STA device, and time information indicated by a duration field in the ACK frame or the BA frame is set according to time information indicated by a duration field in a frame in the non-TB PPDU.

Optionally, in some embodiments, the above communication unit may be a communication interface or a transceiver, or an I/O interface of a communication chip or a SOC. The above processing unit may be one or more processors.

It should be understood that the AP device 500 according to the embodiment of the disclosure may correspond to the AP in the method embodiments of the disclosure, and the above and other operations and/or functions of each unit in the AP device 500 are intended to implement corresponding processes of the AP in the method 200 shown in FIG. 7 respectively, which are not elaborated here, for the sake of brevity.

Figure 17:
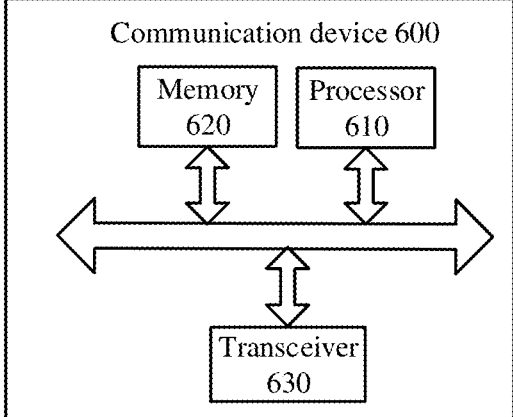
FIG. 17 is a schematic block diagram of a communication device according to an embodiment of the disclosure.

FIG. 17 is a schematic structural diagram of a communication device 600 according to an embodiment of the disclosure. The communication device 600 shown in FIG. 17 includes a processor 610, and the processor 610 may call and run a computer program from a memory, to implement the methods in the embodiments of the disclosure.

Optionally, as shown in FIG. 17, the communication device 600 may further include a memory 620. The processor 610 may call and run a computer program from the memory 620, to implement the methods in the embodiments of the disclosure.

The memory 620 may be an independent device independent of the processor 610, or may be integrated in the processor 610.

Optionally, as shown in FIG. 17, the communication device 600 may further include a transceiver 630, and the processor 610 may control the transceiver 630 to communicate with other devices, specifically, to send information or data to other devices, or receive information or data sent by other devices.

The transceiver 630 may include a transmitter and a receiver. The transceiver 630 may further include antennas, and the number of antennas may be one or more.

Optionally, the communication device 600 may specifically be the AP in the embodiments of the disclosure, and the communication device 600 may implement corresponding processes implemented by the AP in each method of the embodiments of the disclosure, which are not elaborated here, for the sake of brevity.

Optionally, the communication device 600 may specifically be the STA in the embodiments of the disclosure, and the communication device 600 may implement corresponding processes implemented by the STA in each method of the embodiments of the disclosure, which are not elaborated here, for the sake of brevity.

Figure 18:
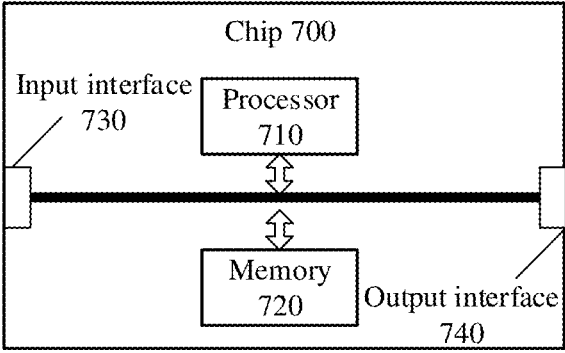
FIG. 18 is a schematic block diagram of a chip according to an embodiment of the disclosure.

FIG. 18 is a schematic structural diagram of a chip according to an embodiment of the disclosure. The chip 700 shown in FIG. 18 includes a processor 710, and the processor 710 may call and run a computer program from a memory, to implement the methods in the embodiments of the disclosure.

Optionally, as shown in FIG. 18, the chip 700 may further include a memory 720. The processor 710 may call and run a computer program from the memory 720, to implement the methods in the embodiments of the disclosure.

The memory 720 may be an independent device independent of the processor 710, or may be integrated in the processor 710.

Optionally, the chip 700 may further include an input interface 730. The processor 710 may control the input interface 730 to communicate with other devices or chips, specifically, may acquire information or data sent by other devices or chips.

Optionally, the chip 700 may further include an output interface 740. The processor 710 may control the output interface 740 to communicate with other devices or chips, specifically, may send information or data to other devices or chips.

Optionally, the chip may be applied to the AP in the embodiments of the disclosure, and the chip may implement corresponding processes implemented by the AP in each method of the embodiments of the disclosure, which are not elaborated here, for the sake of brevity.

Optionally, the chip may be applied to the STA in the embodiments of the disclosure, and the chip may implement corresponding processes implemented by the STA in each method of the embodiments of the disclosure, which are not elaborated here, for the sake of brevity.

It should be understood that the chip mentioned in the embodiment of the disclosure may also be referred to as a system-level chip, a system chip, a chip system, or a SOC chip, etc.

Figure 19:
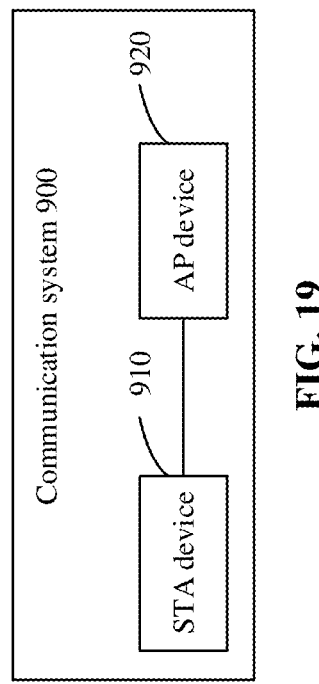
FIG. 19 is a schematic block diagram of a communication system according to an embodiment of the disclosure.

FIG. 19 is a schematic block diagram of a communication system 900 according to an embodiment of the disclosure. As shown in FIG. 19, the communication system 900 includes a STA device 910 and an AP device 920.

The STA device 910 may be configured to implement corresponding functions in the above methods implemented by the first STA, and the AP device 920 may be configured to implement corresponding functions in the above methods implemented by the AP, which are not elaborated here, for the sake of brevity.

Additional Embodiments

Embodiment 1. A method for wireless communication, comprising:

receiving, by a first station (STA), a Multiple-User Request-To-Send Transmission Opportunity Sharing Trigger Frame (MU-RTS-TXS TF) sent by an access point (AP); and setting, by the first STA, time information indicated by a duration field in a Clear-To-Send (CTS) frame according to time information indicated by a duration field in the MU-RTS-TXS TF and/or first indication information, wherein the first indication information is configured to indicate time information for the AP to share a part of an obtained Transmission Opportunity (TXOP) with at least one STA.

Embodiment 2. The method of embodiment 1, wherein the time information indicated by the duration field in the MU-RTS-TXS TF is determined according to at least one of:

an estimated time required for an allowed transmission in a triggered TXOP sharing procedure; or an estimated time required for transmission of an allowed frame exchange sequence defined in TXOP limits.

Embodiment 3. The method of embodiment 2, wherein the allowed transmission in the triggered TXOP sharing procedure comprises at least one of:

transmission of an uplink pending Media Access Control Protocol Data Unit (MPDU) in the triggered TXOP sharing procedure;

transmission of a peer-to-peer pending MPDU in a TXOP sharing mode 2 in the triggered TXOP sharing procedure; or transmission of an Extremely High Throughput (EHT) sounding Null Data Physical Layer Protocol Data Unit (NDP).

Embodiment 4. The method of embodiment 2 or 3, wherein the transmission of the allowed frame exchange sequence defined in TXOP limits comprises at least one of:

transmission of an Extremely High Throughput Multiple-User Physical Layer Protocol Data Unit (EHT MU PPDU);

transmission of an Extremely High Throughput Trigger-Based Physical Layer Protocol Data Unit (EHT TB PPDU);

transmission of the MU-RTS-TXS TF; or transmission of the CTS frame.

Embodiment 5. The method of any one of embodiments 2 to 4, wherein setting, by the first STA, the time information indicated by the duration field in the CTS frame according to the time information indicated by the duration field in the MU-RTS-TXS TF and/or the first indication information comprises:

acquiring, by the first STA, first time information from the duration field of the MU-RTS-TXS TF; and setting the time information indicated by the duration field in the CTS frame according to the first time information and a first time duration, wherein the first time duration is determined according to a time duration from an end time of a Physical Layer Protocol Data Unit (PPDU) carrying the MU-RTS-TXS TF to an end time of a PPDU carrying the CTS frame.

Embodiment 6. The method of embodiment 5, wherein setting the time information indicated by the duration field in the CTS frame according to the first time information and the first time duration comprises:

setting, by the first STA, time information obtained by subtracting the first time duration from the first time information as the time information indicated by the duration field in the CTS frame.

Embodiment 7. The method of any one of embodiments 2 to 6, wherein setting, by the first STA, the time information indicated by the duration field in the CTS frame according to the time information indicated by the duration field in the MU-RTS-TXS TF and/or the first indication information comprises:

setting, by the first STA, the time information indicated by the duration field in the CTS frame according to the time information indicated by the duration field in the MU-RTS-TXS TF, in case that the AP sets the duration field of the MU-RTS-TXS TF with a manner of multiple protection settings.

Embodiment 8. The method of embodiment 7, wherein the AP sets the duration field of the MU-RTS-TXS TF with the manner of multiple protection settings in a triggered TXOP sharing fixedly.

Embodiment 9. The method of embodiment 7, wherein the manner of multiple protection settings is selected by the AP from a plurality of protection setting manners for the duration field of the MU-RTS-TXS TF, and the plurality of protection setting manners comprise a manner of single protection settings and the manner of multiple protection settings.

Embodiment 10. The method of embodiment 1, wherein the duration field of the MU-RTS-TXS TF is set as a total time duration information shared by the AP with the at least one STA.

Embodiment 11. The method of embodiment 10, wherein setting, by the first STA, the time information indicated by the duration field in the CTS frame according to the time information indicated by the duration field in the MU-RTS-TXS TF and/or the first indication information comprises:

acquiring, by the first STA, second time information from the duration field of the MU-RTS-TXS TF; and determining the time information indicated by the duration field in the CTS frame according to the second time information and a first time duration, wherein the first time duration is determined according to a time duration from an end time of a Physical Layer Protocol Data Unit (PPDU) carrying the MU-RTS-TXS TF to an end time of a PPDU carrying the CTS frame.

Embodiment 12. The method of embodiment 11, wherein determining the time information indicated by the duration field in the CTS frame according to the second time information and the first time duration comprises:

setting, by the first STA, time information obtained by subtracting the first time duration from the second time information as the time information indicated by the duration field in the CTS frame.

Embodiment 13. The method of embodiment 11 or 12, wherein setting, by the first STA, the time information indicated by the duration field in the CTS frame according to the time information indicated by the duration field in the MU-RTS-TXS TF and/or the first indication information comprises:

setting, by the first STA, the time information indicated by the duration field in the CTS frame according to the time information indicated by the duration field in the MU-RTS-TXS TF, in case that the AP sets the duration field of the MU-RTS-TXS TF with a manner of single protection settings.

Embodiment 14. The method of embodiment 13, wherein a common information (Common Info) field and/or a user information (User Info) field in the MU-RTS-TXS TF is configured to carry a time information shared by the AP with the at least one STA.

Embodiment 15. The method of embodiment 14, wherein the at least one STA comprises one STA, and time information shared by the AP with the one STA is carried by a User Info field corresponding to the one STA and/or the Common Info field in the MU-RTS-TXS TF.

Embodiment 16. The method of embodiment 14, wherein the at least one STA comprises a plurality of STAs, and the time information shared by the AP with the at least one STA is indicated by one of:

total time duration information shared by the AP with the plurality of STAs;

time duration information shared by the AP with each of the plurality of STAs; or a piece of reference time duration information and a plurality pieces of relative time duration information, wherein the reference time duration information is configured to indicate reference time durations allocated by the AP to the plurality of STAs, and the plurality pieces of relative duration length information correspond to the plurality of STAs one-to-one and are configured to indicate time offsets allocated by the AP to the STAs relative to the reference time durations.

Embodiment 17. The method of embodiment 16, wherein the total time duration information shared by the AP with the plurality of STAs is indicated by the Common Info field in the MU-RTS-TXS TF, the time duration information shared by the AP with each of the plurality of STAs is indicated by User Info fields in the MU-RTS-TXS TF corresponding to the plurality of STAs, the reference time duration information is indicated by the Common Info field in the MU-RTS-TXS TF, and the plurality pieces of relative time duration information are indicated by the User Info fields in the MU-RTS-TXS TF corresponding to the plurality of STAs.

Embodiment 18. The method of embodiment 1, wherein setting, by the first STA, the time information indicated by the duration field in the CTS frame according to the time information indicated by the duration field in the MU-RTS-TXS TF and/or the first indication information comprises:

acquiring, by the first STA, third time information according to the first indication information; and determining the time information indicated by the duration field in the CTS frame according to the third time information and a first time duration, wherein the first time duration is determined according to a time duration from an end time of a Physical Layer Protocol Data Unit (PPDU) carrying the MU-RTS-TXS TF to an end time of a PPDU carrying the CTS frame.

Embodiment 19. The method of embodiment 18, wherein determining the time information indicated by the duration field in the CTS frame according to the third time information and the first time duration comprises:

setting, by the first STA, time information obtained by subtracting the first time duration from the third time information as the time information indicated by the duration field in the CTS frame.

Embodiment 20. The method of embodiment 1, 18 or 19, wherein the first indication information is configured to indicate time information shared by the AP with each of the at least one STA.

Embodiment 21. The method of embodiment 20, wherein the time information shared by the AP with each of the at least one STA comprises:

start time information and time duration information shared by the AP with each of the at least one STA.

Embodiment 22. The method of embodiment 20, wherein the at least one STA comprises a plurality of STAs, and the time information shared by the AP with each of the at least one STA comprises:

reference time duration information configured to indicate reference time durations allocated by the AP to the plurality of STAs;

start time information shared by the AP with each of the at least one STA; and relative time duration information shared by the AP with each of the at least one STA, wherein the relative time duration information is configured to indicate a time offset allocated by the AP to each of the at least one STA relative to the reference time duration.

Embodiment 23. The method of any one of embodiments 18 to 22, wherein the first indication information is carried by a common information (Common Info) field and/or a user information (User Info) field in the MU-RTS-TXS TF.

Embodiment 24. The method of any one of embodiments 18 to 23, further comprising:

determining, by the first STA, a manner of protection settings used by the AP to set the duration field of the MU-RTS-TXS TF, according to the time information indicated by the duration field of the MU-RTS-TXS TF and/or the time information indicated by the first indication information.

Embodiment 25. The method of embodiment 24, wherein determining, by the first STA, the manner of protection settings used by the AP to set protection setting mode used by the AP to set the duration field of the MU-RTS-TXS TF, according to the time information indicated by the duration field of the MU-RTS-TXS TF and/or the time information indicated by the first indication information comprises:

when a time duration indicated by the duration field equals to or greater than a time duration indicated by the first indication information, determining that the AP sets the duration field of the MU-RTS-TXS TF with a manner of multiple protection settings; or when the time duration indicated by the duration field is less than the time duration indicated by the first indication information, determining that the AP sets the duration field of the MU-RTS-TXS TF with a manner of single protection settings.

Embodiment 26. The method of embodiment 24 or 25, wherein setting, by the first STA, the time information indicated by the duration field in the CTS frame according to the time information indicated by the duration field in the MU-RTS-TXS TF and/or the first indication information comprises:

setting the time information indicated by the duration field in the CTS frame according to the manner of protection settings used by the AP to set the duration field of the MU-RTS-TXS TF and according to the duration field of the MU-RTS-TXS TF and/or the first indication information.

Embodiment 27. The method of embodiment 26, wherein setting the time information indicated by the duration field in the CTS frame according to the manner of protection settings used by the AP and according to the duration field of the MU-RTS-TXS TF and/or the first indication information comprises:

setting the time information indicated by the duration field in the CTS frame according to the first indication information, in case that the AP sets the duration field of the MU-RTS-TXS TF with a manner of single protection settings; or setting the time information indicated by the duration field in the CTS frame according to the duration field of the MU-RTS-TXS TF, in case that the AP sets the duration field of the MU-RTS-TXS TF with a manner of multiple protection settings.

Embodiment 28. The method of any one of embodiments 1 to 27, further comprising:

receiving, by the first STA, an Acknowledgment (ACK) frame or a Block Acknowledgment (BA) frame sent by a second STA or the AP, wherein the ACK frame or the BA frame is configured to confirm an Extremely High Throughput Trigger-Based Physical Layer Protocol Data Unit (EHT TB PPDU) sent by the first STA, and time information indicated by a duration field in the ACK frame or the BA frame is set according to time information indicated by a duration field in a frame in the EHT TB PPDU.

Embodiment 29. The method of any one of embodiments 1 to 28, further comprising:

receiving, by the first STA, an Acknowledgment (ACK) frame or a Block Acknowledgment (BA) frame sent by a second STA or the AP, wherein the ACK frame or the BA frame is configured to confirm a non-Trigger Based Physical Layer Protocol Data Unit (non-TB PPDU) sent by the first STA, and time information indicated by a duration field in the ACK frame or the BA frame is set according to time information indicated by a duration field in a frame in the non-TB PPDU.

Embodiment 30. A method for wireless communication, comprising:

sending, by an access point (AP), a Multiple-User Request-To-Send Transmission Opportunity Sharing Trigger Frame (MU-RTS-TXS TF) to at least one station (STA), wherein time information indicated by a duration field in the MU-RTS-TXS TF and/or first indication information are/is used by the at least one STA to set time information indicated by a duration field in a Clear-To-Send (CTS) frame, wherein the first indication information is configured to indicate time information for the AP to share a part of an obtained Transmission Opportunity (TXOP) with the at least one STA.

Embodiment 31. The method of embodiment 30, wherein the time information indicated by the duration field in the MU-RTS-TXS TF is determined according to at least one of:

an estimated time required for an allowed transmission in a triggered TXOP sharing procedure; or an estimated time required for transmission of an allowed frame exchange sequence defined in TXOP limits.

Embodiment 32. The method of embodiment 31, wherein the allowed transmission in the triggered TXOP sharing procedure comprises at least one of:

transmission of an uplink pending Media Access Control Protocol Data Unit (MPDU) in the triggered TXOP sharing procedure;

transmission of a peer-to-peer pending MPDU in a TXOP sharing mode 2 in the triggered TXOP sharing procedure; or transmission of an Extremely High Throughput (EHT) sounding Null Data Physical Layer Protocol Data Unit (NDP).

Embodiment 33. The method of embodiment 31 or 32, wherein the transmission of the allowed frame exchange sequence defined in TXOP limits comprises at least one of:

transmission of an Extremely High Throughput Multiple-User Physical Layer Protocol Data Unit (EHT MU PPDU);

transmission of an Extremely High Throughput Trigger-Based Physical Layer Protocol Data Unit (EHT TB PPDU);

transmission of the MU-RTS-TXS TF; or transmission of the CTS frame.

Embodiment 34. The method of any one of embodiments 31 to 33, further comprising:

setting, by the AP, the time information indicated by the duration field in the MU-RTS-TXS TF according to the estimated time required for the allowed transmission in the triggered TXOP sharing procedure and/or the estimated time required for transmission of the allowed frame exchange sequence defined in TXOP limits, in case that the AP sets the duration field of the MU-RTS-TXS TF with a manner of multiple protection settings.

Embodiment 35. The method of embodiment 34, wherein the AP sets the duration field of the MU-RTS-TXS TF with the manner of multiple protection settings in a triggered TXOP sharing fixedly.

Embodiment 36. The method of embodiment 34, wherein the manner of multiple protection settings is selected by the AP from a plurality of protection setting manners for the duration field of the MU-RTS-TXS TF, and the plurality of protection setting manners comprise a manner of single protection settings and the manner of multiple protection settings.

Embodiment 37. The method of embodiment 30, wherein the duration field of the MU-RTS-TXS TF is set as a total time duration information shared by the AP with the at least one STA.

Embodiment 38. The method of embodiment 37, further comprising:

setting, by the AP, the duration field of the MU-RTS-TXS TF as the total time duration information shared by the AP with the at least one STA, in case that the AP sets the duration field of the MU-RTS-TXS TF with a manner of single protection settings.

Embodiment 39. The method of any one of embodiments 30 to 38, wherein a common information (Common Info) field and/or a user information (User Info) field in the MU-RTS-TXS TF is configured to carry a time information shared by the AP with the at least one STA.

Embodiment 40. The method of embodiment 39, wherein the at least one STA comprises one STA, and time information shared by the AP with the one STA is carried by a User Info field corresponding to the one STA and/or the Common Info field in the MU-RTS-TXS TF.

Embodiment 41. The method of embodiment 39, wherein the at least one STA comprises a plurality of STAs, and the time information shared by the AP with the at least one STA is indicated by one of:

total time duration information shared by the AP with the plurality of STAs;

time duration information shared by the AP with each of the plurality of STAs; or a piece of reference time duration information and a plurality pieces of relative time duration information, wherein the reference time duration information is configured to indicate reference time durations allocated by the AP to the plurality of STAs, and the plurality pieces of relative time duration information correspond to the plurality of STAs one-to-one and are configured to indicate time offsets allocated by the AP to the STAs relative to the reference time durations.

Embodiment 42. The method of embodiment 41, wherein the total time duration information shared by the AP with the plurality of STAs is indicated by the Common Info field in the MU-RTS-TXS TF, the time duration information shared by the AP with each of the plurality of STAs is indicated by User Info fields in the MU-RTS-TXS TF corresponding to the plurality of STAs, the reference time duration information is indicated by the Common Info field in the MU-RTS-TXS TF, and the plurality pieces of relative time duration information are indicated by the User Info fields in the MU-RTS-TXS TF corresponding to the plurality of STAs.

Embodiment 43. The method of any one of embodiments 30 to 42, wherein the first indication information is configured to indicate time information shared by the AP with each of the at least one STA.

Embodiment 44. The method of embodiment 43, wherein the time information shared by the AP with each of the at least one STA comprises:

start time information and time duration information shared by the AP with each of the at least one STA.

Embodiment 45. The method of embodiment 43, wherein the at least one STA comprises a plurality of STAs, and the time information shared by the AP with each of the at least one STA comprises:

reference time duration information configured to indicate reference time durations allocated by the AP to the plurality of STAs;

start time information shared by the AP with each of the at least one STA; and relative time duration information shared by the AP with each of the at least one STA, wherein the relative time duration information is configured to indicate a time offset allocated by the AP to each of the at least one STA relative to the reference time duration.

Embodiment 46. The method of any one of embodiments 43 to 45, wherein the first indication information is carried by a common information (Common Info) field and/or a user information (User Info) field in the MU-RTS-TXS TF.

Embodiment 47. The method of any one of embodiments 30 to 46, further comprising:

sending, by the AP, an Acknowledgment (ACK) frame or a Block Acknowledgment (BA) frame to a first STA, wherein the ACK frame or the BA frame is configured to confirm an Extremely High Throughput Trigger-Based Physical Layer Protocol Data Unit (EHT TB PPDU) sent by the first STA, and time information indicated by a duration field in the ACK frame or the BA frame is set according to time information indicated by a duration field in a frame in the EHT TB PPDU.

Embodiment 48. The method of any one of embodiments 30 to 47, further comprising:

sending, by the AP, an Acknowledgment (ACK) frame or a Block Acknowledgment (BA) frame to a first STA, wherein the ACK frame or the BA frame is configured to confirm a non-Trigger Based Physical Layer Protocol Data Unit (non-TB PPDU) sent by the first STA, and time information indicated by a duration field in the ACK frame or the BA frame is set according to time information indicated by a duration field in a frame in the non-TB PPDU.

Embodiment 49. A station (STA) device, comprising:
a communication unit, configured to receive a Multiple-User-Request-To-Send-Transmission Opportunity Sharing Trigger Frame (MU-RTS-TXS TF) sent by an access point (AP) device; and
a processing unit, configured to set time information indicated by a duration field in a Clear-To-Send (CTS) frame according to a time information indicated by a duration field in the MU-RTS-TXS TF and/or first indication information, wherein the first indication information is configured to indicate time information for the AP device to share a part of an obtained Transmission Opportunity (TXOP) with at least one STA device.

Embodiment 50. The STA device of embodiment 49, wherein the time information indicated by the duration field in the MU-RTS-TXS TF is determined according to at least one of:

an estimated time required for an allowed transmission in a triggered TXOP sharing procedure; or an estimated time required for transmission of an allowed frame exchange sequence defined in TXOP limits.

Embodiment 51. The STA device of embodiment 50, wherein the allowed transmission in the triggered TXOP sharing procedure comprises at least one of:

transmission of an uplink pending Media Access Control Protocol Data Unit (MPDU) in the triggered TXOP sharing procedure;

transmission of a peer-to-peer pending MPDU in a TXOP sharing mode 2 in the triggered TXOP sharing procedure; or transmission of an Extremely High Throughput (EHT) sounding Null Data Physical Layer Protocol Data Unit (NDP).

Embodiment 52. The STA device of embodiment 50 or 51, wherein the transmission of the allowed frame exchange sequence defined in TXOP limits comprises at least one of:

transmission of an Extremely High Throughput Multiple-User Physical Layer Protocol Data Unit (EHT MU PPDU);

transmission of an Extremely High Throughput Trigger-Based Physical Layer Protocol Data Unit (EHT TB PPDU);

transmission of the MU-RTS-TXS TF; or transmission of the CTS frame.

Embodiment 53. The STA device of any one of embodiments 50 to 52, wherein the processing unit is further configured to:

acquire first time information from the duration field of the MU-RTS-TXS TF; and set the time information indicated by the duration field in the CTS frame according to the first time information and a first time duration, wherein the first time duration is determined according to a time duration from an end time of a Physical Layer Protocol Data Unit (PPDU) carrying the MU-RTS-TXS TF to an end time of a PPDU carrying the CTS frame.

Embodiment 54. The STA device of embodiment 53, wherein the processing unit is further configured to:

set time information obtained by subtracting the first time duration from the first time information as the time information indicated by the duration field in the CTS frame.

Embodiment 55. The STA device of any one of embodiments 50 to 54, wherein the processing unit is further configured to:

set the time information indicated by the duration field in the CTS frame according to the time information indicated by the duration field in the MU-RTS-TXS TF, in case that the AP device sets the duration field of the MU-RTS-TXS TF with a manner of multiple protection settings.

Embodiment 56. The STA device of embodiment 55, wherein the AP device sets the duration field of the MU-RTS-TXS TF with the manner of multiple protection settings in a triggered TXOP sharing fixedly.

Embodiment 57. The STA device of embodiment 55, wherein the manner of multiple protection settings is selected by the AP device from a plurality of protection setting manners for the duration field of the MU-RTS-TXS TF, and the plurality of protection setting manners comprise a manner of single protection settings and the manner of multiple protection settings.

Embodiment 58. The STA device of embodiment 49, wherein the duration field of the MU-RTS-TXS TF is set as a total time duration information shared by the AP device with the at least one STA device.

Embodiment 59. The STA device of embodiment 58, wherein the processing unit is further configured to:

acquire second time information from the duration field of the MU-RTS-TXS TF; and determine the time information indicated by the duration field in the CTS frame according to the second time information and a first time duration, wherein the first time duration is determined according to a time duration from an end time of a Physical Layer Protocol Data Unit (PPDU) carrying the MU-RTS-TXS TF to an end time of a PPDU carrying the CTS frame.

Embodiment 60. The STA device of embodiment 59, wherein the processing unit is further configured to:

set time information obtained by subtracting the first time duration from the second time information as the time information indicated by the duration field in the CTS frame.

Embodiment 61. The STA device of embodiment 59 or 60, wherein the processing unit is further configured to:

set the time information indicated by the duration field in the CTS frame according to the time information indicated by the duration field in the MU-RTS-TXS TF, in case that the AP device sets the duration field of the MU-RTS-TXS TF with a manner of single protection settings.

Embodiment 62. The STA device of embodiment 61, wherein a common information (Common Info) field and/or a user information (User Info) field in the MU-RTS-TXS TF is configured to carry a time information shared by the AP device with the at least one STA device.

Embodiment 63. The STA device of embodiment 62, wherein the at least one STA device comprises one STA device, and time information shared by the AP device with the one STA device is carried by a User Info field corresponding to the one STA device and/or the Common Info field in the MU-RTS-TXS TF.

Embodiment 64. The STA device of embodiment 62, wherein the at least one STA device comprises a plurality of STA devices, and the time information shared by the AP device with the at least one STA device is indicated by one of:

total time duration information shared by the AP device with the plurality of STA devices;

time duration information shared by the AP device with each of the plurality of STA devices; or a piece of reference time duration information and a plurality pieces of relative time duration information, wherein the reference time duration information is configured to indicate reference time durations allocated by the AP device to the plurality of STA devices, and the plurality pieces of relative time duration information correspond to the plurality of STA devices one-to-one and are configured to indicate time offsets allocated by the AP device to the STA devices relative to the reference time durations.

Embodiment 65. The STA device of embodiment 64, wherein the total time duration information shared by the AP device with the plurality of STA devices is indicated by the Common Info field in the MU-RTS-TXS TF, the time duration information shared by the AP device with each of the plurality of STA devices is indicated by User Info fields in the MU-RTS-TXS TF corresponding to the plurality of STA devices, the reference time duration information is indicated by the Common Info field in the MU-RTS-TXS TF, and the plurality pieces of relative time duration information are indicated by the User Info fields in the MU-RTS-TXS TF corresponding to the plurality of STA devices.

Embodiment 66. The STA device of embodiment 49, wherein the processing unit is further configured to:

acquire third time information according to the first indication information; and determine the time information indicated by the duration field in the CTS frame according to the third time information and a first time duration, wherein the first time duration is determined according to a time duration from an end time of a Physical Layer Protocol Data Unit (PPDU) carrying the MU-RTS-TXS TF to an end time of a PPDU carrying the CTS frame.

Embodiment 67. The STA device of embodiment 66, wherein the processing unit is further configured to:

set time information obtained by subtracting the first time duration from the third time information as the time information indicated by the duration field in the CTS frame.

Embodiment 68. The STA device of embodiment 49, 66 or 67, wherein the first indication information is configured to indicate time information shared by the AP device with each of the at least one STA device.

Embodiment 69. The STA device of embodiment 68, wherein the time information shared by the AP device with each of the at least one STA device comprises:

start time information and time duration information shared by the AP device with each of the at least one STA device.

Embodiment 70. The STA device of embodiment 68, wherein the at least one STA comprises a plurality of STAs, and the time information shared by the AP device with each of the at least one STA device comprises:

reference time duration information configured to indicate reference time durations allocated by the AP device to the plurality of STA devices;

start time information shared by the AP device with each of the at least one STA device; and relative time duration information shared by the AP device with each of the at least one STA device, wherein the relative time duration information is configured to indicate a time offset allocated by the AP device to each of the at least one STA device relative to the reference time duration.

Embodiment 71. The STA device of any one of embodiments 66 to 70, wherein the first indication information is carried by a common information (Common Info) field and/or a user information (User Info) field in the MU-RTS-TXS TF.

Embodiment 72. The STA device of any one of embodiments 66 to 71, wherein the processing unit is further configured to:

determine a manner of protection settings used by the AP device to set the duration field of the MU-RTS-TXS TF, according to the time information indicated by the duration field of the MU-RTS-TXS TF and/or the time information indicated by the first indication information.

Embodiment 73. The STA device of embodiment 72, wherein the processing unit is further configured to:

when a time duration indicated by the duration field equals to or greater than a time duration indicated by the first indication information, determine that the AP device sets the duration field of the MU-RTS-TXS TF with a manner of multiple protection settings; or when the time duration indicated by the duration field is less than the time duration indicated by the first indication information, determine that the AP device sets the duration field of the MU-RTS-TXS TF with a manner of single protection settings.

Embodiment 74. The STA device of embodiment 72 or 73, wherein the processing unit is further configured to:

determine, according to the protection setting manners used by the AP device to set the duration field of the MU-RTS-TXS TF, the time information indicated by the duration field in the CTS frame to be set according to the duration field of the MU-RTS-TXS TF or the first indication information.

Embodiment 75. The STA device of embodiment 74, wherein the processing unit is further configured to:

set the time information indicated by the duration field in the CTS frame according to the first indication information, in case that the AP device sets the duration field of the MU-RTS-TXS TF with a manner of single protection settings; or set the time information indicated by the duration field in the CTS frame according to the duration field of the MU-RTS-TXS TF, in case that the AP device sets the duration field of the MU-RTS-TXS TF with a manner of multiple protection settings.

Embodiment 76. The STA device of any one of embodiments 49 to 75, wherein the communication unit is further configured to:

receive an Acknowledgment (ACK) frame or a Block Acknowledgment (BA) frame sent by a second STA device or the AP device, wherein the ACK frame or the BA frame is configured to confirm an Extremely High Throughput Trigger-Based Physical Layer Protocol Data Unit (EHT TB PPDU) sent by the STA device, and time information indicated by a duration field in the ACK frame or the BA frame is set according to time information indicated by a duration field in a frame in the EHT TB PPDU.

Embodiment 77. The STA device of any one of embodiments 49 to 76, wherein the communication unit is further configured to:

receive an Acknowledgment (ACK) frame or a Block Acknowledgment (BA) frame sent by a second STA device or the AP device, wherein the ACK frame or the BA frame is configured to confirm a non-Trigger Based Physical Layer Protocol Data Unit (non-TB PPDU) sent by the STA device, and time information indicated by a duration field in the ACK frame or the BA frame is set according to time information indicated by a duration field in a frame in the non-TB PPDU.

Embodiment 78. An access point (AP) device, comprising:

a communication unit, configured to send a Multiple-User Request-To-SendTransmission Opportunity Sharing Trigger Frame (MU-RTS-TXS TF) to at least one station (STA) device, wherein a time information indicated by a duration field in the MU-RTS-TXS TF and/or a first indication information are used by the at least one STA device to set time information indicated by a duration field in a Clear-To-Send (CTS) frame, wherein the first indication information is configured to indicate time information for the AP device to share a part of an obtained Transmission Opportunity (TXOP) with the at least one STA device.

Embodiment 79. The AP device of embodiment 78, wherein the time information indicated by the duration field in the MU-RTS-TXS TF is determined according to at least one of:

an estimated time required for an allowed transmission in a triggered TXOP sharing procedure; or an estimated time required for transmission of an allowed frame exchange sequence defined in TXOP limits.

Embodiment 80. The AP device of embodiment 79, wherein the allowed transmission in the triggered TXOP sharing procedure comprises at least one of:

transmission of an uplink pending Media Access Control Protocol Data Unit (MPDU) in the triggered TXOP sharing procedure;

transmission of a peer-to-peer pending MPDU in a TXOP sharing mode 2 in the triggered TXOP sharing procedure; or transmission of an Extremely High Throughput (EHT) sounding Null Data Physical Layer Protocol Data Unit (NDP).

Embodiment 81. The AP device of embodiment 79 or 80, wherein the transmission of the allowed frame exchange sequence defined in TXOP limits comprises at least one of:

transmission of an Extremely High Throughput Multiple-User Physical Layer Protocol Data Unit (EHT MU PPDU);

transmission of an Extremely High Throughput Trigger-Based Physical Layer Protocol Data Unit (EHT TB PPDU);

transmission of the MU-RTS-TXS TF; or transmission of the CTS frame.

Embodiment 82. The AP device of any one of embodiments 79 to 81, further comprising:

a processing unit, configured to set the time information indicated by the duration field in the MU-RTS-TXS TF according to the estimated time required for the allowed transmission in the triggered TXOP sharing procedure and/or the estimated time required for transmission of the allowed frame exchange sequence defined in TXOP limits, in case that the duration field of the MU-RTS-TXS TF is set with a manner of multiple protection settings.

Embodiment 83. The AP device of embodiment 82, wherein the AP device sets the duration field of the MU-RTS-TXS TF with the manner of multiple protection settings in a triggered TXOP sharing fixedly.

Embodiment 84. The AP device of embodiment 82, wherein the manner of multiple protection settings is selected by the AP device from a plurality of protection setting manners for the duration field of the MU-RTS-TXS TF, and the plurality of protection setting manners comprise a manner of single protection settings and the manner of multiple protection settings.

Embodiment 85. The AP device of embodiment 78, wherein the duration field of the MU-RTS-TXS TF is set as a total time duration information shared by the AP device with the at least one STA device.

Embodiment 86. The AP device of embodiment 85, further comprising:

a processing unit, configured to set the duration field of the MU-RTS-TXS TF as the total time duration information shared by the AP device with the at least one STA device, in case that the duration field of the MU-RTS-TXS TF is set with a manner of single protection settings.

Embodiment 87. The AP device of any one of embodiments 78 to 86, wherein a common information (Common Info) field and/or a user information (User Info) field in the MU-RTS-TXS TF is configured to carry a time information shared by the AP device with the at least one STA device.

Embodiment 88. The AP device of embodiment 87, wherein the at least one STA device comprises one STA device, and time information shared by the AP device with the one STA device is carried by a User Info field corresponding to the one STA device and/or the Common Info field in the MU-RTS-TXS TF.

Embodiment 89. The AP device of embodiment 87, wherein the at least one STA device comprises a plurality of STA devices, and the time information shared by the AP device with the at least one STA device is indicated by one of:

total time duration information shared by the AP device with the plurality of STA devices;

time duration information shared by the AP device with each of the plurality of STA devices; or a piece of reference time duration information and a plurality pieces of relative time duration information, wherein the reference time duration information is configured to indicate reference time durations allocated by the AP device to the plurality of STA devices, and the plurality pieces of relative time duration information correspond to the plurality of STA devices one-to-one and are configured to indicate time offsets allocated by the AP device to the STA devices relative to the reference time durations.

Embodiment 90. The AP device of embodiment 89, wherein the total time duration information shared by the AP device with the plurality of STA devices is indicated by the Common Info field in the MU-RTS-TXS TF, the time duration information shared by the AP device with each of the plurality of STA devices is indicated by User Info fields in the MU-RTS-TXS TF corresponding to the plurality of STA devices, the reference time duration information is indicated by the Common Info field in the MU-RTS-TXS TF, and the plurality pieces of relative time duration information are indicated by the User Info fields in the MU-RTS-TXS TF corresponding to the plurality of STA devices.

Embodiment 91. The AP device of any one of embodiments 78 to 90, wherein the first indication information is configured to indicate time information shared by the AP device with each of the at least one STA device.

Embodiment 92. The AP device of embodiment 91, wherein the time information shared by the AP device with each of the at least one STA device comprises:

start time information and time duration information shared by the AP device with each of the at least one STA device.

Embodiment 93. The AP device of embodiment 91, wherein the at least one STA comprises a plurality of STAs, and the time information shared by the AP device with each of the at least one STA device comprises:

reference time duration information configured to indicate reference time durations allocated by the AP device to the plurality of STA devices;

start time information shared by the AP device with each of the at least one STA device; and relative time duration information shared by the AP device with each of the at least one STA device, wherein the relative time duration information is configured to indicate a time offset allocated by the AP device to each of the at least one STA device relative to the reference time duration.

Embodiment 94. The AP device of any one of embodiments 91 to 93, wherein the first indication information is carried by a common information (Common Info) field and/or a user information (User Info) field in the MU-RTS-TXS TF.

Embodiment 95. The AP device of any one of embodiments 78 to 94, wherein the communication unit is further configured to:

send an Acknowledgment (ACK) frame or a Block Acknowledgment (BA) frame to a first STA device, wherein the ACK frame or the BA frame is configured to confirm an Extremely High Throughput Trigger-Based Physical Layer Protocol Data Unit (EHT TB PPDU) sent by the first STA device, and time information indicated by a duration field in the ACK frame or the BA frame is set according to time information indicated by a duration field in a frame in the EHT TB PPDU.

Embodiment 96. The AP device of any one of embodiments 78 to 95, wherein the communication unit is further configured to:

send an Acknowledgment (ACK) frame or a Block Acknowledgment (BA) frame to a first STA device, wherein the ACK frame or the BA frame is configured to confirm a non-Trigger Based Physical Layer Protocol Data Unit (non-TB PPDU) sent by the first STA device, and time information indicated by a duration field in the ACK frame or the BA frame is set according to time information indicated by a duration field in a frame in the non-TB PPDU.

Embodiment 97. A station (STA) device, comprising:

a memory, configured to store a computer program; and a processor, configured to call and run the computer program stored in the memory, to execute the method of any one of embodiments 1 to 29.

Embodiment 98. A chip, comprising:

a processor, configured to call and run a computer program from a memory, so that a device installed with the chip executes the method of any one of embodiments 1 to 29.

Embodiment 99. A computer-readable storage medium, configured to store a computer program, the computer program allowing a computer to execute the method of any one of embodiments 1 to 29.

Embodiment 100. A computer program product, comprising computer program instructions, the computer program instructions allowing a computer to execute the method of any one of embodiments 1 to 29.

Embodiment 101. A computer program, allowing a computer to execute the method of any one of embodiments 1 to 29.

Embodiment 102. An access point (AP) device, comprising:

a memory, configured to store a computer program; and a processor, configured to call and run the computer program stored in the memory, to execute the method of any one of embodiments 30 to 48.

Embodiment 103. A chip, comprising:

a processor, configured to call and run a computer program from a memory, so that a device installed with the chip executes the method of any one of embodiments 30 to 48.

Embodiment 104. A computer-readable storage medium, configured to store a computer program, the computer program allowing a computer to execute the method of any one of embodiments 30 to 48.

Embodiment 105. A computer program product, comprising computer program instructions, the computer program instructions allowing a computer to execute the method of any one of embodiments 30 to 48.

Embodiment 106. A computer program, allowing a computer to execute the method of any one of embodiments 30 to 48.

It should be understood that the processor in the embodiment of the disclosure may be an integrated circuit chip with signal processing capability. During implementation, each operation of the above method embodiments may be completed by an integrated logic circuit in form of hardware in a processor or instructions in form of software. The above processor may be a general-purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components, so that various methods, operations and logic block diagrams disclosed in the embodiments of the disclosure may be implemented or executed. The general-purpose processor may be a microprocessor, or the processor may be any conventional processor, etc. Operations of the methods disclosed in combination with the embodiments of the disclosure may be directly embodied as being performed and completed by a hardware decoding processor, or by a combination of hardware and software modules in the decoding processor. The software modules may be located in a mature storage medium in the field, such as a Random Access Memory (RAM), a flash memory, a Read-Only Memory (ROM), a Programmable ROM (PROM), or an electrically erasable programmable memory, a register, etc. The storage medium is located in the memory, and the processor reads information in the memory, and completes operations of the above methods in combination with hardware thereof.

It may be understood that the memory in the embodiment of the disclosure may be a volatile memory or a non-volatile memory, or may include both volatile and non-volatile memories. The non-volatile memory may be a ROM, a PROM, an Erasable PROM (EPROM), an Electrically EPROM (EEPROM) or a flash memory. The volatile memory may be a RAM which is used as an external cache. By way of exemplary rather than limiting descriptions, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories of the systems and methods described here are intended to include, but are not limited to, these and any other suitable types of memories.

It should be understood that the above memories are exemplary rather than limiting descriptions. For example, the memory in the embodiment of the disclosure may also be a SRAM, a DRAM, a SDRAM, a DDR SDRAM, an ESDRAM, a SLDRAM, a DR RAM, etc. That is, the memories in the embodiments of the disclosure are intended to include, but are not limited to, these and any other suitable types of memories.

An embodiment of the disclosure further provides a computer-readable storage medium, configured to store a computer program.

Optionally, the computer-readable storage medium may be applied to the AP in the embodiments of the disclosure, and the computer program allows a computer to execute corresponding processes implemented by the AP in each method of the embodiments of the disclosure, which are not elaborated here, for the sake of brevity.

Optionally, the computer-readable storage medium may be applied to the STA in the embodiments of the disclosure, and the computer program allows a computer to execute corresponding processes implemented by the STA in each method of the embodiments of the disclosure, which are not elaborated here, for the sake of brevity.

An embodiment of the disclosure further provides a computer program product, including computer program instructions.

Optionally, the computer program product may be applied to the AP in the embodiments of the disclosure, and the computer program instructions allow a computer to execute corresponding processes implemented by the AP in each method of the embodiments of the disclosure, which are not elaborated here, for the sake of brevity.

Optionally, the computer program product may be applied to the STA in the embodiments of the disclosure, and the computer program instructions allow a computer to execute corresponding processes implemented by the STA in each method of the embodiments of the disclosure, which are not elaborated here, for the sake of brevity.

An embodiment of the disclosure further provides a computer program.

Optionally, the computer program may be applied to the AP in the embodiments of the disclosure, and the computer program allows a computer to execute corresponding processes implemented by the AP in each method of the embodiments of the disclosure when the computer program is run on the computer, which are not elaborated here, for the sake of brevity.

Optionally, the computer program may be applied to the STA in the embodiments of the disclosure, and the computer program allows a computer to execute corresponding processes implemented by the STA in each method of the embodiments of the disclosure when the computer program is run on the computer, which are not elaborated here, for the sake of brevity.

It may be appreciated by those of ordinary skill in the art that units and algorithm steps of examples described in combination with the embodiments disclosed here may be implemented by electronic hardware, or a combination of computer software and electronic hardware. Whether these functions are executed by hardware or software, depends on specific applications and design constraints of the technical solutions. Professional technicians may use different methods in each specific application to implement the described functions, however, such implementation should not be considered as going beyond the scope of the disclosure.

It may be clearly understood by those skilled in the art that for the sake of convenience and brevity of descriptions, specific working processes of the above systems, devices and units may refer to corresponding processes in the foregoing method embodiments, which are not elaborated here.

In several embodiments provided in the disclosure, it should be understood that the disclosed systems, devices and methods may be implemented in other ways. For example, the above device embodiments are only illustrative. For example, division of the units is only a logical function division. In an actual implementation, there may be other division manners. For example, multiple units or components may be combined or may be integrated into another system, or some features may be ignored, or may not be executed. In another point, mutual coupling or direct coupling or communication connection as shown or discussed may be indirect coupling or communication connection through some interfaces, devices or units, and may be in electrical, mechanical or other forms.

The units described as separate components may be or may not be physically separated, and the components displayed as units may be or may not be physical units, that is, they may be located in one place, or may be distributed on multiple network units. Part or all of the units may be selected according to actual needs, to achieve the purpose of the solutions of the embodiments.

Furthermore, each functional unit in each embodiment of the disclosure may be integrated into one processing unit, or each unit may separately exist physically, or two or more units may be integrated into one unit.

When the functions are implemented in form of a software function unit and sold or used as an independent product, the functions may be stored in a computer-readable storage medium. Based on such understanding, the technical solutions of the disclosure substantially or parts making contributions to the related art may be embodied in form of a software product, and the computer software product is stored in a storage medium, including several instructions to enable a computer device (which may be a personal computer, a server, or a network device, etc.) to execute all or part of operations of the method described in each embodiment of the disclosure. The foregoing storage medium includes various media capable of storing program codes, such as a U disk, a mobile hard disk, a ROM, a RAM, a magnetic disk or an optical disk, etc.

The above descriptions are only specific implementations of the disclosure, however, the scope of protection of the disclosure is not limited thereto. Variations or substitutions easily conceived by any technician familiar with this technical field within the technical scope disclosed in the disclosure, should fall within the scope of protection of the disclosure. Therefore, the scope of protection of the disclosure shall be subjected to the scope of protection of the claims.

The invention claimed is:

1. A method for wireless communication, comprising:
receiving, by a first station (STA), a Multiple-User Request-To-Send Transmission Opportunity Sharing Trigger Frame (MU-RTS-TXS TF) sent by an access point (AP), wherein a duration field of the MU-RTS-TXS TF is set by the AP with a manner of fixed multiple protection settings among single protection settings and multiple protection settings in a triggered Transmission Opportunity (TXOP) sharing, and a value D of the duration field of the MU-RTS-TXS TF is set by a following method:
when $T_{TXOP}=0$ and $T_{END-NAV}=0$, then $D=T_{SINGLE-MSDU}-T_{PPDU}$;
otherwise, when $T_{TXOP}=0$ and $T_{END-NAV}>0$, then $D=\max(0, T_{END-NAV}-T_{PPDU})$;
otherwise, when $T_{END-NAV}=0$, then min $(T_{PENDING}, T_{TXOP}-T_{PPDU}) \leq D \leq T_{TXOP}-T_{PPDU}$;
otherwise, $T_{END-NAV}-T_{PPDU} \leq D \leq T_{TXOP-REMAINING}-T_{PPDU}$;
wherein the $T_{TXOP}$ represents time given by dot11EDCATableTXOPLimit for an Access Category (AC), the $T_{END-NAV}$ represents remaining duration of any network allocation vector (NAV) set by the TXOP holder, the $T_{SINGLE-MSDU}$ represents estimated time required for transmission of allowed frame exchange sequence defined in TXOP limits, the $T_{PPDU}$ represents time required for transmission of a current Physical Layer Protocol Data Unit (PPDU), the $T_{PENDING}$ represents estimated time required for allowed transmission in triggered TXOP sharing procedure, and the $T_{TXOP-REMAINING}$ represents remaining time in the $T_{TXOP}$; and
setting directly, by the first STA, time information indicated by a duration field in a Clear-To-Send (CTS) frame according to time information indicated by the duration field in the MU-RTS-TXS TF.

2. The method of claim 1, wherein the time information indicated by the duration field in the MU-RTS-TXS TF is determined according to at least one of:
an estimated time required for an allowed transmission in a triggered TXOP sharing procedure; or
an estimated time required for transmission of an allowed frame exchange sequence defined in TXOP limits.

3. The method of claim 2, wherein setting directly, by the first STA, the time information indicated by the duration field in the CTS frame according to the time information indicated by the duration field in the MU-RTS-TXS TF comprises:
acquiring, by the first STA, first time information from the duration field of the MU-RTS-TXS TF; and
setting the time information indicated by the duration field in the CTS frame according to the first time information and a first time duration, wherein the first time duration is determined according to a time duration from an end time of a PPDU carrying the MU-RTS-TXS TF to an end time of a PPDU carrying the CTS frame.

4. The method of claim 3, wherein setting the time information indicated by the duration field in the CTS frame according to the first time information and the first time duration comprises:
setting, by the first STA, time information obtained by subtracting the first time duration from the first time information as the time information indicated by the duration field in the CTS frame.

5. The method of claim 2, wherein setting directly, by the first STA, the time information indicated by the duration field in the CTS frame according to the time information indicated by the duration field in the MU-RTS-TXS TF comprises:
setting, by the first STA, the time information indicated by the duration field in the CTS frame according to the time information indicated by the duration field in the MU-RTS-TXS TF, in case that the AP sets the duration field of the MU-RTS-TXS TF with a manner of multiple protection settings.

6. The method of claim 1, wherein the duration field of the MU-RTS-TXS TF is set as a total time duration information shared by the AP with the at least one STA.

7. The method of claim 6, wherein setting directly, by the first STA, the time information indicated by the duration field in the CTS frame according to the time information indicated by the duration field in the MU-RTS-TXS TF comprises:
acquiring, by the first STA, second time information from the duration field of the MU-RTS-TXS TF; and
determining the time information indicated by the duration field in the CTS frame according to the second time information and a first time duration, wherein the first time duration is determined according to a time duration from an end time of a Physical Layer Protocol Data Unit (PPDU) carrying the MU-RTS-TXS TF to an end time of a PPDU carrying the CTS frame.

8. The method of claim 7, wherein determining the time information indicated by the duration field in the CTS frame according to the second time information and the first time duration comprises:

setting, by the first STA, time information obtained by subtracting the first time duration from the second time information as the time information indicated by the duration field in the CTS frame.

9. A station (STA) device, comprising:

a memory, configured to store a computer program; and a processor, configured to call and run the computer program stored in the memory to perform a method for wireless communication comprising:

receiving a Multiple-User-Request-To-Send-Transmission Opportunity Sharing Trigger Frame (MU-RTS-TXS TF) sent by an access point (AP) device, wherein a duration field of the MU-RTS-TXS TF is set by the AP with a manner of fixed multiple protection settings among single protection settings and multiple protection settings in a triggered Transmission Opportunity (TXOP) sharing, and a value D of the duration field of the MU-RTS-TXS TF is set by a following method:

when $T_{TXOP}=0$ and $T_{END-NAV}=0$, then $D=T_{SINGLE-MSDU}-T_{PPDU}$;

otherwise, when $T_{TXOP}=0$ and $T_{END-NAV}>0$, then $D=\max(0, T_{END-NAV}-T_{PPDU})$;

otherwise, when $T_{END-NAV}=0$, then min $(T_{PENDING}, T_{TXOP}-T_{PPDU})\leq D\leq T_{TXOP}-T_{PPDU}$;

otherwise, $T_{END-NAV}-T_{PPDU}\leq D\leq T_{TXOP-REMAINING}-T_{PPDU}$;

wherein the $T_{TXOP}$ represents time given by dot11EDCATableTXOPLimit for an Access Category (AC), the $T_{END-NAV}$ represents remaining duration of any network allocation vector (NAV) set by the TXOP holder, the $T_{SINGLE-MSDU}$ represents estimated time required for transmission of allowed frame exchange sequence defined in TXOP limits, the $T_{PPDU}$ represents time required for transmission of a current Physical Layer Protocol Data Unit (PPDU), the $T_{PENDING}$ represents estimated time required for allowed transmission in triggered TXOP sharing procedure, and the $T_{TXOP-REMAINING}$ represents remaining time in the $T_{TXOP}$; and setting directly time information indicated by a duration field in a Clear-To-Send (CTS) frame according to a time information indicated by the duration field in the MU-RTS-TXS TF.

10. The STA device of claim 9, wherein the time information indicated by the duration field in the MU-RTS-TXS TF is determined according to at least one of:

an estimated time required for an allowed transmission in a triggered TXOP sharing procedure; or an estimated time required for transmission of an allowed frame exchange sequence defined in TXOP limits.

11. The STA device of claim 10, wherein setting directly the time information indicated by the duration field in the CTS frame according to the time information indicated by the duration field in the MU-RTS-TXS TF comprises:

acquiring first time information from the duration field of the MU-RTS-TXS TF; and setting the time information indicated by the duration field in the CTS frame according to the first time information and a first time duration, wherein the first time duration is determined according to a time duration from an end time of a PPDU carrying the MU-RTS-TXS TF to an end time of a PPDU carrying the CTS frame.

12. The STA device of claim 11, wherein setting the time information indicated by the duration field in the CTS frame according to the first time information and the first time duration comprises:

setting time information obtained by subtracting the first time duration from the first time information as the time information indicated by the duration field in the CTS frame.

13. The STA device of claim 10, wherein setting directly the time information indicated by the duration field in the CTS frame according to the time information indicated by the duration field in the MU-RTS-TXS TF comprises:

setting the time information indicated by the duration field in the CTS frame according to the time information indicated by the duration field in the MU-RTS-TXS TF, in case that the AP device sets the duration field of the MU-RTS-TXS TF with a manner of multiple protection settings.

14. The STA device of claim 9, wherein the duration field of the MU-RTS-TXS TF is set as a total time duration information shared by the AP device with the at least one STA device.

15. The STA device of claim 14, wherein setting directly the time information indicated by the duration field in the CTS frame according to the time information indicated by the duration field in the MU-RTS-TXS TF comprises:

acquiring second time information from the duration field of the MU-RTS-TXS TF; and determining the time information indicated by the duration field in the CTS frame according to the second time information and a first time duration, wherein the first time duration is determined according to a time duration from an end time of a Physical Layer Protocol Data Unit (PPDU) carrying the MU-RTS-TXS TF to an end time of a PPDU carrying the CTS frame.

16. The STA device of claim 15, wherein determining the time information indicated by the duration field in the CTS frame according to the second time information and the first time duration comprises:

setting time information obtained by subtracting the first time duration from the second time information as the time information indicated by the duration field in the CTS frame.

17. An access point (AP) device, comprising:

a memory, configured to store a computer program; and a processor, configured to call and run the computer program stored in the memory to perform a method for wireless communication comprising:

sending a Multiple-User Request-To-Send Transmission Opportunity Sharing Trigger Frame (MU-RTS-TXS TF) to at least one station (STA), wherein time information indicated by a duration field in the MU-RTS-TXS TF is used by the at least one STA to set directly time information indicated by a duration field in a Clear-To-Send (CTS) frame, wherein the duration field of the MU-RTS-TXS TF is set by the AP with a manner of fixed multiple protection settings among single protection settings and multiple protection settings in a triggered Transmission Opportunity (TXOP) sharing, and a value D of the duration field of the MU-RTS-TXS TF is set by a following method:

when $T_{TXOP}=0$ and $T_{END\text{-}NAV}=0$, then $D=T_{SINGLE\text{-}MSDU}-T_{PPDU}$;

otherwise, when $T_{TXOP}=0$ and $T_{END\text{-}NAV}>0$, then $D=\max(0, T_{END\text{-}NAV}-T_{PPDU})$;

otherwise, when $T_{END\text{-}NAV}=0$, then $\min (T_{PENDING}, T_{TXOP}-T_{PPDU})\leq D\leq T_{TXOP}-T_{PPDU}$;

otherwise, $T_{END\text{-}NAV}-T_{PPDU}\leq D\leq T_{TXOP\text{-}REMAINING}-T_{PPDU}$, wherein the $T_{TXOP}$ represents time given by dot11EDCATableTXOPLimit for an Access Category (AC), the $T_{END\text{-}NAV}$ represents remaining duration of any network allocation vector (NAV) set by the TXOP holder, the $T_{SINGLE\text{-}MSDU}$ represents estimated time required for transmission of allowed frame exchange sequence defined in TXOP limits, the $T_{PPDU}$ represents time required for transmission of a current Physical Layer Protocol Data Unit (PPDU), the $T_{PENDING}$ represents estimated time required for allowed transmission in triggered TXOP sharing procedure, and the $T_{TXOP}$-REMAINING represents remaining time in the $T_{TXOP}$.

18. The AP device of claim 17, wherein the time information indicated by the duration field in the MU-RTS-TXS TF is determined according to at least one of:

an estimated time required for an allowed transmission in a triggered TXOP sharing procedure; or an estimated time required for transmission of an allowed frame exchange sequence defined in TXOP limits.

19. The AP device of claim 18, wherein first time information is acquired by the first STA from the duration field of the MU-RTS-TXS TF, and the time information indicated by the duration field in the CTS frame is set according to the first time information and a first time duration, wherein the first time duration is determined according to a time duration from an end time of a PPDU carrying the MU-RTS-TXS TF to an end time of a PPDU carrying the CTS frame.

20. The AP device of claim 17, wherein the duration field of the MU-RTS-TXS TF is set as a total time duration information shared by the AP with the at least one STA.

\*    \*    \*    \*    \*